(12) United States Patent
Katou et al.

(10) Patent No.: US 9,228,072 B2
(45) Date of Patent: Jan. 5, 2016

(54) METHOD FOR MANUFACTURING RUBBER COMPOSITION

(75) Inventors: Seiichi Katou, Tokyo (JP); Satoshi Horie, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 85 days.

(21) Appl. No.: 13/876,997

(22) PCT Filed: Oct. 3, 2011

(86) PCT No.: PCT/JP2011/072790
§ 371 (c)(1),
(2), (4) Date: Jun. 25, 2013

(87) PCT Pub. No.: WO2012/043854
PCT Pub. Date: Apr. 5, 2012

(65) Prior Publication Data
US 2013/0267638 A1    Oct. 10, 2013

(30) Foreign Application Priority Data

Oct. 1, 2010    (JP) ................. 2010-224357

(51) Int. Cl.
| | |
|---|---|
| *C08K 5/09* | (2006.01) |
| *C08K 3/36* | (2006.01) |
| *C08J 3/20* | (2006.01) |
| *C08K 5/548* | (2006.01) |
| *C08K 5/00* | (2006.01) |

(52) U.S. Cl.
CPC ... *C08K 3/36* (2013.01); *C08J 3/20* (2013.01); *C08K 5/09* (2013.01); *C08K 5/548* (2013.01); *C08J 2309/00* (2013.01); *C08K 5/0025* (2013.01)

(58) Field of Classification Search
USPC .............. 524/261, 274, 575.5, 575, 322, 300; 523/351
See application file for complete search history.

(56) References Cited

U.S. PATENT DOCUMENTS

| | | |
|---|---|---|
| 6,420,488 B1 | 7/2002 | Penot |
| 2001/0034389 A1 | 10/2001 | Vasseur |
| 2002/0188050 A1 | 12/2002 | Yagi et al. |
| 2003/0105242 A1 | 6/2003 | Penot |
| 2003/0144394 A1 | 7/2003 | Penot et al. |
| 2010/0048775 A1 | 2/2010 | Mihara et al. |
| 2010/0105805 A1 | 4/2010 | Sasaka |
| 2012/0157575 A1* | 6/2012 | Ozawa et al. .............. 523/467 |

FOREIGN PATENT DOCUMENTS

| | | | |
|---|---|---|---|
| JP | 07-165991 A | 6/1995 | |
| JP | 11-263882 A | 9/1999 | |
| JP | 2002-521515 A | 7/2002 | |
| JP | 2002-521516 A | 7/2002 | |
| JP | 2002-348412 A | 12/2002 | |
| JP | 2003-523472 A | 8/2003 | |
| JP | 2003-530443 A | 10/2003 | |
| WO | 96/30419 A1 | 10/1996 | |
| WO | 2008/102513 A1 | 8/2008 | |
| WO | 2008/123306 A1 | 10/2008 | |
| WO | WO 2009/068643 | * | 6/2009 |
| WO | WO 2010/150827 | * | 12/2010 |

* cited by examiner

*Primary Examiner* — James J Seidleck
*Assistant Examiner* — Deve E Valdez
(74) *Attorney, Agent, or Firm* — Sughrue Mion, PLLC

(57) ABSTRACT

The present invention relates to a method for producing a rubber composition containing a rubber component (A) of at least one selected from natural rubbers and synthetic dienic rubbers, a filler containing an inorganic filler (B), a silane coupling agent (C) and a vulcanization promoter (D), wherein the rubber composition is kneaded in multiple stages, and in the first stage of kneading, the rubber component (A), all or a part of the inorganic filler (B), and all or a part of the silane coupling agent (C) are kneaded, and then on the way of the first stage, the vulcanization promoter (D) is added and further kneaded. The production method enables production of a rubber composition having a low-heat-generation property while successfully preventing the coupling function activity of the silane coupling agent from lowering.

17 Claims, No Drawings

METHOD FOR MANUFACTURING RUBBER COMPOSITION

TECHNICAL FIELD

The present invention relates to a method for producing a rubber composition containing an inorganic filler and having an improved low-heat-generation property.

BACKGROUND ART

Recently, in association with the movement of global regulation of carbon dioxide emission associated with the increase in attraction to environmental concerns, the demand for low fuel consumption by automobiles is increasing. To satisfy the requirement, it is desired to reduce rolling resistance relating to tire performance. Heretofore, as a means for reducing the rolling resistance of tires, a method of optimizing tire structures has been investigated; however, at present, a technique of using a low-heat-generating rubber composition for tires has become employed as the most common method.

For obtaining such a low-heat-generating rubber composition, there is known a method of using an inorganic filler such as silica or the like.

However, in incorporating an inorganic filler such as silica or the like in a rubber composition to prepare an inorganic filler-containing rubber composition, the inorganic filler, especially silica aggregates in the rubber composition (owing to the hydroxyl group in the surface of silica), and therefore, for preventing the aggregation, a silane coupling agent is used.

Accordingly, for successfully solving the above-mentioned problem by incorporation of a silane coupling agent, various trials have been made for increasing the activity of the coupling function of the silane coupling agent.

For example, Patent Reference 1 proposes a rubber composition containing, as basic components, at least (i) one diene elastomer, (ii) a white filler as a reinforcing filler and (iii) an alkoxysilane polysulfide as a coupling agent (white filler/diene elastomer) along with (iv) an enamine and (v) a guanidine derivative.

Patent Reference 2 discloses a rubber composition containing, as basic components, at least (i) one diene elastomer, (ii) a white filler as a reinforcing filler and (iii) an alkoxysilane polysulfide as a coupling agent (white filler/diene elastomer) along with (iv) zinc thiophosphate and (v) a guanidine derivative.

Patent Reference 3 describes a rubber composition containing, as basic components, at least (i) a diene elastomer, (ii) an inorganic filler as a reinforcing filler and (iii) an alkoxysilane polysulfide (PSAS) as an (inorganic filler/diene elastomer) coupling agent, as combined with (iv) an aldimine (R—CH=N—R) and (v) a guanidine derivative.

Further, Patent Reference 4 proposes a rubber composition basically containing at least (i) a diene elastomer, (ii) an inorganic filer as a reinforcing filer and (iii) an alkoxysilane polysulfide as a coupling agent, as combined with (iv) 1,2-dihydropyridine and (v) a guanidine derivative.

However, in these inventions, nothing is taken into consideration relating to kneading conditions.

As a case of increasing the activity of the coupling function of a silane coupling agent in consideration of kneading conditions, there is mentioned Patent Reference 5; however, it is desired to further improve the effect of enhancing the activity of the coupling function of a silane coupling agent.

CITATION LIST

Patent References

Patent Reference 1: JP-T 2002-521515
Patent Reference 2: JP-T 2002-521516
Patent Reference 3: JP-T 2003-530443
Patent Reference 4: JP-T 2003-523472
Patent Reference 5: WO2008/123306

SUMMARY OF THE INVENTION

Problems that the Invention is to Solve

Given the situation as above, an object of the present invention is to provide a method for producing a rubber composition capable of further increasing the activity of the coupling function of a silane coupling agent to thereby successfully produce a low-heat-generating rubber composition.

Means for Solving the Problems

For solving the above-mentioned problems, the present inventors have made various investigations of a kneading method of kneading a rubber component, all or a part of an inorganic filler, all or a part of a silane coupling agent, and at least one vulcanization promoter selected from guanidines, sulfenamides, thiazoles, thiurams, dithiocarbamate salts, thioureas and xanthate salts in the first stage of the kneading step therein, and, as a result, have experimentally found that, in order to enhance the activity of the coupling function, it is good to optimize the time when at least one vulcanization promoter selected from guanidines, sulfenamides, thiazoles, thiurams, dithiocarbamate salts, thioureas and xanthate salts is added to the composition, and have completed the present invention.

Specifically, the present invention is a method for producing a rubber composition containing a rubber component (A) of at least one selected from natural rubbers and synthetic dienic rubbers, a filler containing an inorganic filler (B), a silane coupling agent (C) and a vulcanization promoter (D), wherein the rubber composition is kneaded in multiple stages, and in the first stage of kneading, the rubber component (A), all or a part of the inorganic filler (B), and all or a part of the silane coupling agent (C) are kneaded, and then on the way of the first stage, the vulcanization promoter (D) is added and further kneaded.

Advantage of the Invention

According to the present invention, there is provided a method for producing a rubber composition capable of further increasing the activity of the coupling function of a silane coupling agent to produce a rubber composition excellent in low-heat-generation property.

MODE FOR CARRYING OUT THE INVENTION

The present invention is described in detail hereinunder.

The method for producing a rubber composition of the present invention is a method for producing a rubber composition containing a rubber component (A) of at least one selected from natural rubbers and synthetic dienic rubbers, a filler containing an inorganic filler (B), a silane coupling agent (C) and a vulcanization promoter (D), wherein the rubber composition is kneaded in multiple stages, and in the first stage of kneading, the rubber component (A), all or a part of the inorganic filler (B), and all or a part of the silane coupling agent (C) are kneaded, and then on the way of the first stage, the vulcanization promoter (D) is added and further kneaded.

In the present invention, preferably, the vulcanization promoter (D) is at least one selected from guanidines, sulfenamides, thiazoles, thiurams, dithiocarbamate salts, thioureas and xanthate salts.

In the present invention, the vulcanization promoter (D), preferably at least one vulcanization promoter (D) selected from guanidines, sulfenamides, thiazoles, thiurams, dithiocarbamate salts, thioureas and xanthate salts is added in the first stage of kneading, and this is because the vulcanization promoter enhances the activity of the coupling function of the silane coupling agent (C). In the first stage of kneading, the rubber component (A), all or a part of the inorganic filler (B) and all or a part of the silane coupling agent are kneaded and then on the way of the first stage, the vulcanization promoter (D) is added and further kneaded, and this is because the addition of the vulcanization promoter (D) further enhances the coupling function activity enhancing effect. Specifically, in this mode, the silane coupling agent (C) can react with the rubber component (A) after the inorganic filler (B) has sufficiently reacted with silane coupling agent (C).

The time to be taken before the vulcanization promoter (D) is added on the way of the first stage of kneading after the rubber component (A), all or apart of the inorganic filler (B) and all or apart of the silane coupling agent (C) are added in the first stage of kneading is preferably from 10 to 180 seconds. More preferably, the lower limit of the time is at least 30 seconds, and the upper limit thereof is at most 150 seconds, even more preferably at most 120 seconds. When the time is at least 10 seconds, then the reaction of (B) and (C) can fully go on. Even when the time is more than 180 seconds, the reaction of (B) and (C) would have already fully gone on, and any additional effect could no more be expected; and therefore, the upper limit is preferably 180 seconds.

In order to more favorably enhance the activity of the coupling function of the silane coupling agent (C), it is desirable that the vulcanization promoter (D) is added when the temperature of the rubber composition reached 130 to 180° C. in the first stage of kneading.

The kneading step for the rubber composition in the present invention includes at least two stages of the first stage of kneading the others than vulcanization-related chemicals except the vulcanization promoter (D) and the final stage of kneading those including vulcanization-related chemicals, and may optionally include an intermediate stage of kneading the others than vulcanization-related chemicals except the vulcanization promoter (D). Here the vulcanization-related chemicals are chemicals relevant to vulcanization concretely including a vulcanizing agent and a vulcanization promoter.

The first stage of kneading in the present invention is the first stage of kneading the rubber component (A), the inorganic filler (B) and the silane coupling agent (C), but does not include a case of kneading the rubber component (A) and the other filler than the inorganic filler (B) in the initial stage and a case of pre-kneading the rubber component (A) alone.

In the present invention, the kneading stage before the final stage such as the first stage, the intermediate stage and others is a step of mixing the other starting materials than vulcanization-related chemicals (vulcanizing agent and vulcanization promoter), such as the rubber component, the inorganic filler, the coupling agent and others and kneading them, and this is a step of dispersing the inorganic filler in the rubber composition and reinforcing the rubber component. One characteristic feature of the present invention is that the vulcanization promoter (D) is incorporated in the first stage to thereby better the dispersion of the inorganic filler in the rubber composition. As the case may be, the rubber component, the filler and others may be incorporated and kneaded in the intermediate stage.

In case where the method of the present invention includes an intermediate stage after the first stage of kneading and before the final stage, preferably, the highest temperature of the rubber composition in the intermediate kneading stage is from 120 to 190° C., more preferably from 130 to 175° C., even more preferably from 140 to 170° C. The kneading time is preferably from 10 seconds to 20 minutes, more preferably from 10 seconds to 10 minutes, even more preferably from 30 seconds to 5 minutes. When the method includes the intermediate stage, it is desirable that after the first kneading stage, the temperature of the rubber composition is lowered by at least 10° C. than the temperature thereof after the kneading of the first stage and thereafter the composition is processed in the subsequent stage.

The final stage of kneading is a step of incorporating vulcanization-related chemicals (vulcanizing agent, vulcanization promoter) and kneading the ingredients. Preferably, the highest temperature of the rubber composition in the final stage is from 60 to 140° C., more preferably from 80 to 120° C., even more preferably from 100 to 120° C. The kneading time is preferably from 10 seconds to 20 minutes, more preferably from 10 seconds to 10 minutes, even more preferably from 20 seconds to 5 minutes.

When the rubber composition is processed sequentially from the first kneading stage, the intermediate stage to the final stage, it is desirable that the temperature of the rubber composition is lowered by at least 10° C. than the temperature thereof after the first kneading stage and thereafter the composition is processed in the subsequent stage.

[Silane Coupling Agent (C)]

The silane coupling agent (C) for use in the rubber composition production method of the present invention is preferably at least one compound selected from a group consisting of compounds of the following general formulae (I) to (IV).

Using the silane coupling agent (C) of the type, the rubber composition in the method of the present invention is excellent in workability thereof and can give pneumatic tires having good abrasion resistance.

General formulae (I) to (IV) are sequentially described below.

[Chemical Formula 1]

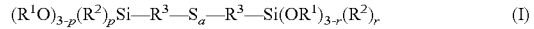
$(R^1O)_{3-p}(R^2)_p Si-R^3-S_a-R^3-Si(OR^1)_{3-r}(R^2)_r$ (I)

wherein multiple $R^1$'s may be the same or different, each representing a linear, cyclic or branched alkyl group having from 1 to 8 carbon atoms, a linear or branched alkoxylalkyl group having from 2 to 8 carbon atoms, or a hydrogen atom; multiple $R^2$'s may be the same or different, each representing a linear, cyclic or branched alkyl group having from 1 to 8 carbon atoms; multiple $R^3$'s may be the same or different, each representing a linear or branched alkylene group having from 1 to 8 carbon atoms; a indicates from 2 to 6 as a mean value; p and r may be the same or different, each indicating from 0 to 3 as a mean value, provided that both p and r are not 3 at the same time.

Specific examples of the silane coupling agent (C) represented by the above-mentioned general formula (I) include bis(3-triethoxysilylpropyl)tetrasulfide, bis(3-trimethoxysilylpropyl)tetrasulfide, bis(3-methyldimethoxysilylpropyl)tetrasulfide, bis(2-triethoxysilylethyl)tetrasulfide,
bis(3-triethoxysilylpropyl)disulfide,
bis(3-trimethoxysilylpropyl)disulfide,
bis(3-methyldimethoxysilylpropyl)disulfide,
bis(2-triethoxysilylethyl)disulfide,
bis(3-triethoxysilylpropyl)trisulfide,
bis(3-trimethoxysilylpropyl)trisulfide,
bis(3-methyldimethoxysilylpropyl)trisulfide,
bis(2-triethoxysilylethyl)trisulfide,
bis(3-monoethoxydimethylsilylpropyl)tetrasulfide,
bis(3-monoethoxydimethylsilylpropyl)trisulfide,
bis(3-monoethoxydimethylsilylpropyl)disulfide,
bis(3-monomethoxydimethylsilylpropyl)tetrasulfide,
bis(3-monomethoxydimethylsilylpropyl)trisulfide,
bis(3-monomethoxydimethylsilylpropyl)disulfide,
bis(2-monoethoxydimethylsilylethyl)tetrasulfide,
bis(2-monoethoxydimethylsilylethyl)trisulfide,
bis(2-monoethoxydimethylsilylethyl)disulfide.

[Chemical Formula 2]

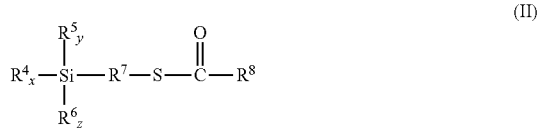

(II)

wherein $R^4$ represents a monovalent group selected from —Cl, —Br, $R^9O$—, $R^9C(=O)O$—, $R^9R^{10}C=NO$—, $R^9R^{10}CNO$—, $R^9R^{10}N$—, and —$(OSiR^9R^{10})_h$ $(OSiR^9R^{10}R^{11})$ (where $R^9$, $R^{10}$ and $R^{11}$ each represents a hydrogen atom or a monovalent hydrocarbon group having from 1 to 18 carbon atoms; and h indicates from 1 to 4 as a mean value); $R^5$ represents $R^4$, a hydrogen atom, or a hydrocarbon group having from 1 to 18 carbon atoms; $R^6$ represents $R^4$, $R^5$, a hydrogen atom, or a group —$[O(R^{12}O)_j]_{0.5}$ (where $R^{12}$ represents an alkylene group having from 1 to 18 carbon atoms; and j indicates an integer of from 1 to 4); $R^7$ represents a divalent hydrocarbon group having from 1 to 18 carbon atoms; $R^8$ represents a monovalent hydrocarbon group having from 1 to 18 carbon atoms; x, y and z each indicates a number satisfying the relationship of x+y+2z=3, 0≤x≤3, 0≤y≤2, 0≤z≤1.

In the general formula (II), $R^8$, $R^9$, $R^{10}$ and $R^{11}$ may be the same or different, each preferably representing a linear, cyclic or branched alkyl, alkenyl, aryl or aralkyl group having from 1 to 18 carbon atoms. In case where $R^5$ is a monovalent hydrocarbon group having from 1 to 18 carbon atoms, the group is preferably a linear, cyclic or branched alkyl, alkenyl, aryl or aralkyl group. Preferably, $R^{12}$ is a linear, cyclic or branched alkylene group, and is more preferably a linear one. $R^7$ is, for example, an alkylene group having from 1 to 18 carbon atoms, an alkenylene group having from 2 to 18 carbon atoms, a cycloalkylene group having from 5 to 18 carbon atoms, a cycloalkylalkylene group having from 6 to 18 carbon atoms, an arylene group having from 6 to 18 carbon atoms, or an aralkylene group having from 7 to 18 carbon atoms. The alkylene group and the alkenylene group may be linear or branched; and the cycloalkylene group, the cycloalkylalkylene group, the arylene group and the aralkylene group may have a substituent such as a lower alkyl group or the like on the ring thereof. Preferably, $R^7$ is an alkylene group having from 1 to 6 carbon atoms, more preferably a linear alkylene group, for example, a methylene group, an ethylene group, a trimethylene group, a tetramethylene group, a pentamethylene group or a hexamethylene group.

Specific examples of the monovalent hydrocarbon group having from 1 to 18 carbon atoms of $R^5$, $R^8$, $R^9$, $R^{10}$ and $R^{11}$ in the general formula (II) include a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group, a cyclohexenyl group, a phenyl group, a tolyl group, a xylyl group, a naphthyl group, a benzyl group, a phenethyl group, a naphthylmethyl group, etc.

Examples of $R^{12}$ in the general formula (II) include a methylene group, an ethylene group, a trimethylene group, a tetramethylene group, a pentamethylene group, a hexamethylene group, an octamethylene group, a decamethylene group, a dodecamethylene group, etc.

Specific examples of the silane coupling agent (C) represented by the general formula (II) include
3-hexanoylthiopropyltriethoxysilane,
3-octanoylthiopropyltriethoxysilane,
3-decanoylthiopropyltriethoxysilane,
3-lauroylthiopropyltriethoxysilane,
2-hexanoylthioethyltriethoxysilane,
2-octanoylthioethyltriethoxysilane,
2-decanoylthioethyltriethoxysilane,
2-lauroylthioethyltriethoxysilane,
3-hexanoylthiopropyltrimethoxysilane,
3-octanoylthiopropyltrimethoxysilane,
3-decanoylthiopropyltrimethoxysilane,
3-lauroylthiopropyltrimethoxysilane,
2-hexanoylthioethyltrimethoxysilane,
2-octanoylthioethyltrimethoxysilane,
2-decanoylthioethyltrimethoxysilane,
2-lauroylthioethyltrimethoxysilane, etc. Of those, especially preferred is 3-octanoylthiopropyltriethoxysilane (General Electric Silicones' trade name NXT Silane).

[Chemical Formula 3]

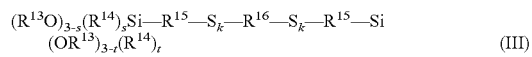

(III)

wherein multiple $R^{13}$'s may be the same or different, each representing a linear, cyclic or branched alkyl group having from 1 to 8 carbon atoms, a linear or branched alkoxylalkyl group having from 2 to 8 carbon atoms, or a hydrogen atom; multiple $R^{14}$'s may be the same or different, each representing a linear, cyclic or branched alkyl group having from 1 to 8 carbon atoms; multiple $R^{15}$'s may be the same or different, each representing a linear or branched alkylene group having from 1 to 8 carbon atoms; $R^{16}$ represents a divalent group of a general formula (—S—$R^{17}$—S—), (—$R^{18}$—$S_{m1}$—$R^{19}$—) or (—$R^{20}$—$S_{m2}$—$R^{21}$—$S_{m3}$—$R^{22}$—) (where $R^{17}$ to $R^{22}$ each represents a divalent hydrocarbon group, a divalent aromatic group or a divalent organic group containing a hetero element except sulfur and oxygen, having from 1 to 20 carbon atoms; m1, m2 and m3 may be the same or different, each indicating from 1 to less than 4 as a mean value); multiple k's may be the same or different, each indicating from 1 to 6 as a mean value; s and t each indicates from 0 to 3 as a mean value, provided that both s and t are not 3 at the same time.

Preferred examples of the silane coupling agent (C) represented by the above-mentioned general formula (III) are compounds represented by an average compositional formula $(CH_3CH_2O)_3Si$—$(CH_2)_3$—$S_2$—$(CH_2)_6$—$S_2$—$(CH_2)_3$—$Si(OCH_2CH_3)_3$, an average compositional formula $(CH_3CH_2O)_3Si$—$(CH_2)_3$—$S_2$—$(CH_2)_{10}$—$S_2$—$(CH_2)_3$—$Si$ (OCH$_2$CH$_3$)$_3$, an average compositional formula (CH$_3$CH$_2$O)$_3$Si—(CH$_2$)$_3$—S$_3$—(CH$_2$)$_6$—S$_3$—(CH$_2$)$_3$—Si(OCH$_2$CH$_3$)$_3$, an average compositional formula (CH$_3$CH$_2$O)$_3$Si—(CH$_2$)$_3$—S$_4$—(CH$_2$)$_6$—S$_4$—(CH$_2$)$_3$—Si(OCH$_2$CH$_3$)$_3$, an average compositional formula (CH$_3$CH$_2$O)$_3$Si—(CH$_2$)$_3$—S—(CH$_2$)$_6$—S$_2$—(CH$_2$)$_6$—S—(CH$_2$)$_3$—Si(OCH$_2$CH$_3$)$_3$, an average compositional formula (CH$_3$CH$_2$O)$_3$Si—(CH$_2$)$_3$—S—(CH$_2$)$_6$—S$_{2.5}$—(CH$_2$)$_6$—S—(CH$_2$)$_3$—Si(OCH$_2$CH$_3$)$_3$, an average compositional formula (CH$_3$CH$_2$O)$_3$Si—(CH$_2$)$_3$—S—(CH$_2$)$_6$—S$_3$—(CH$_2$)$_6$—S—(CH$_2$)$_3$—Si(OCH$_2$CH$_3$)$_3$, an average compositional formula (CH$_3$CH$_2$O)$_3$Si—(CH$_2$)$_3$—S—(CH$_2$)$_6$—S$_4$—(CH$_2$)$_6$—S—(CH$_2$)$_3$—Si(OCH$_2$CH$_3$)$_3$, an average compositional formula (CH$_3$CH$_2$O)$_3$Si—(CH$_2$)$_3$—S—(CH$_2$)$_{10}$—S$_2$—(CH$_2$)$_{10}$—S—(CH$_2$)$_3$—Si(OCH$_2$CH$_3$)$_3$, an average compositional formula (CH$_3$CH$_2$O)$_3$Si—(CH$_2$)$_3$—S$_4$—(CH$_2$)$_6$—S$_4$—(CH$_2$)$_6$—S$_4$—(CH$_2$)$_3$—Si(OCH$_2$CH$_3$)$_3$, an average compositional formula (CH$_3$CH$_2$O)$_3$Si—(CH$_2$)$_3$—S$_2$—(CH$_2$)$_6$—S$_2$—(CH$_2$)$_6$—S$_2$—(CH$_2$)$_3$—Si(OCH$_2$CH$_3$)$_3$, an average compositional formula (CH$_3$CH$_2$O)$_3$Si—(CH$_2$)$_3$—S—(CH$_2$)$_6$—S$_2$—(CH$_2$)$_6$—S$_2$—(CH$_2$)$_6$—S—(CH$_2$)$_3$—Si(OCH$_2$CH$_3$)$_3$, etc.

[Chemical Formula 4]

$$[R^{23}\text{—C}(\!\!=\!\!O)\text{—S—G—SiZ}^a_u Z^b_v Z^c_w]_m [\text{HS—G—SiZ}^a_u Z^b_v Z^c_w]_n \quad (IV)$$

$$\underbrace{\phantom{XXXXXXXXXXX}}_{A} \quad \underbrace{\phantom{XXXXXXXXXXX}}_{B}$$

wherein $R^{23}$ represents a linear, branched or cyclic alkyl group having from 1 to 20 carbon atoms; multiple G's may be the same or different, each representing an alkanediyl group or an alkenediyl group having from 1 to 9 carbon atoms; multiple $Z^a$'s may be the same or different, each representing a functional group capable of bonding to the two silicon atoms and selected from [—O—]$_{0.5}$, [—O-G-]$_{0.5}$ and [—O-G-O—]$_{0.5}$; multiple $Z^b$'s may be the same or different, each representing a functional group capable of bonding to the two silicon atoms and represented by [—O-G-O—]$_{0.5}$; multiple $Z^c$'s may be the same or different, each representing a functional group selected from —Cl, —Br, —OR$^a$, R$^a$C(=O)O—, R$^a$R$^b$C=NO—, R$^a$R$^b$N—, R$^a$— and HO-G-O— (where G is the same as above); R$^a$ and R$^b$ each represents a linear, branched or cyclic alkyl group having from 1 to 20 carbon atoms; m, n, u, v and w each are 1≤m≤20, 0≤n≤20, 0≤u≤3, 0≤v≤2, 0≤w≤1, and (u/2)+v+2w is 2 or 3; in case where the formula has multiple A's, then $Z^a_u$, $Z^b_v$ and $Z^c_w$ may be the same or different in those multiple A's; in case where the formula has multiple B's, then $Z^a_u$, $Z^b_v$ and $Z^c_w$ may be the same or different in those multiple B's.

Specific examples of the silane coupling agent (C) represented by the general formula (IV) include the following chemical formula (V), chemical formula (VI) and chemical formula (VII):

[Chemical Formula 5]

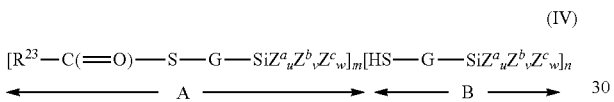

(V)

[Chemical Formula 6]

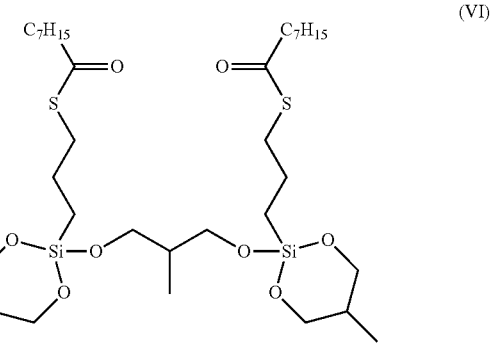

(VI)

[Chemical Formula 7]

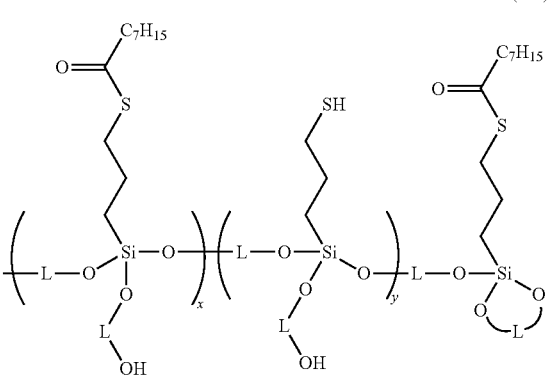

(VII)

In the formula, L each independently represents an alkanediyl group or an alkenediyl group having from 1 to 9 carbon atoms; and x=m and y=n.

As the silane coupling agent represented by the chemical formula (V), a commercial product is available as "NXT Low-V Silane", a trade name by Momentive Performance Materials.

As the silane coupling agent represented by the chemical formula (VI), a commercial product is available as "NXT Ultra Low-V Silane", a trade name by Momentive Performance Materials.

Further, as the silane coupling agent represented by the chemical formula (VII), there is mentioned a commercial product of "NXT-Z", a trade name by Momentive Performance Materials.

The silane coupling agent represented by the general formula (II), the chemical formula (V) or the chemical formula (VI) has a protected mercapto group, and is therefore effective for preventing initial scorching in the processing process before the vulcanization step, and accordingly, the processability thereof is good.

In the silane coupling agent represented by the general formula (V), (VI) or (VII), the carbon number of the alkoxysilane is large, and therefore the amount of the volatile compound VOC (especially alcohol) to be generated from the agent is small, and accordingly, the agent is favorable in point of working environment. Further, the silane coupling agent of the chemical formula (VII) provides a low-heat-generation property as tire performance, and is therefore more preferred.

Of the compounds represented by the general formulae (I) to (IV), those represented by the above-mentioned general formula (I) are especially preferred as the silane coupling agent (C) for use in the present invention. The vulcanization promoter (D) can readily activate the polysulfide bond that reacts with the rubber component (A).

In the present invention, one alone or two or more different types of the silane coupling agents (C) may be used either singly or as combined.

Regarding the amount of the silane coupling agent (C) to be in the rubber composition in the present invention, preferably, the ratio by mass of {silane coupling agent (C)/inorganic filler (B)} is from (1/100) to (20/100). When the ratio is at least (1/100), then the effect of enhancing the low-heat-generation property of the rubber composition can be more successfully exhibited; and when at most (20/100), the cost of the rubber composition is low and the economic potential thereof increases. Further, the ratio by mass is more preferably from (3/100) to (20/100), even more preferably from (4/100) to (10/100).

[Vulcanization Promoter (D)]

Guanidines, sulfenamides, thiazoles, thiurams, dithiocarbamate salts, thioureas and xanthate salts preferred for the vulcanization promoter (D) for use in the rubber composition production method of the present invention are described in detail.

The guanidines for use in the rubber composition production method of the present invention include 1,3-diphenylguanidine, 1,3-di-o-tolylguanidine, 1-o-tolylbiguanide, dicatechol borate di-o-tolylguanidine salt, 1,3-di-o-cumenylguanidine, 1,3-di-o-biphenylguanidine, 1,3-di-o-cumenyl-2-propionylguanidine, etc. Preferred are 1,3-diphenylguanidine, 1,3-di-o-tolylguanidine and 1-o-tolylbiguanide as having high reactivity.

The sulfenamides for use in the rubber composition production method of the present invention include
N-cyclohexyl-2-benzothiazolylsulfenamide,
N,N-dicyclohexyl-2-benzothiazolylsulfenamide,
N-tert-butyl-2-benzothiazolylsulfenamide,
N-oxydiethylene-2-benzothiazolylsulfenamide,
N-methyl-2-benzothiazolylsulfenamide,
N-ethyl-2-benzothiazolylsulfenamide,
N-propyl-2-benzothiazolylsulfenamide,
N-butyl-2-benzothiazolylsulfenamide,
N-pentyl-2-benzothiazolylsulfenamide,
N-hexyl-2-benzothiazolylsulfenamide,
N-pentyl-2-benzothiazolylsulfenamide,
N-octyl-2-benzothiazolylsulfenamide,
N-2-ethylhexyl-2-benzothiazolylsulfenamide,
N-decyl-2-benzothiazolylsulfenamide,
N-dodecyl-2-benzothiazolylsulfenamide,
N-stearyl-2-benzothiazolylsulenamide,
N,N-dimethyl-2-benzothiazolylsulenamide,
N,N-diethyl-2-benzothiazolylsulenamide,
N,N-dipropyl-2-benzothiazolylsulenamide,
N,N-dibutyl-2-benzothiazolylsulenamide,
N,N-dipentyl-2-benzothiazolylsulenamide,
N,N-dihexyl-2-benzothiazolylsulenamide,
N,N-dipentyl-2-benzothiazolylsulenamide,
N,N-dioctyl-2-benzothiazolylsulenamide,
N,N-di-2-ethylhexylbenzothiazolylsulfenamide,
N-decyl-2-benzothiazolylsulenamide,
N,N-didodecyl-2-benzothiazolylsulenamide,
N,N-distearyl-2-benzothiazolylsulenamide, etc. Of those, preferred are N-cyclohexyl-2-benzothiazolylsulenamide and N-tert-butyl-2-benzothiazolylsulenamide, as having high reactivity.

The thiazoles for use in the rubber composition production method of the present invention include 2-mercaptobenzothiazole, di-2-benzothiazolyl disulfide, 2-mercaptobenzothiazole zinc salt, 2-mercaptobenzothiazole cyclohexylamine salt, 2-(N,N-diethylthiocarbamoylthio)benzothiazole, 2-(4'-morpholinodithio)benzothiazole, 4-methyl-2-mercaptobenzothiazole, di-(4-methyl-2-benzothiazolyl)disulfide, 5-chloro-2-mercaptobenzothiazole, 2-mercaptobenzothiazole sodium, 2-mercapto-6-nitrobenzothiazole, 2-mercapto-naphtho[1,2-d]thiazole, 2-mercapto-5-methoxybenzothiazole, 6-amino-2-mercaptobenzothiazole, etc. Of those, preferred are 2-mercaptobenzothiazole and di-2-benzothiazolyl disulfide, as having high reactivity.

The thiurams for use in the rubber composition production method of the present invention include tetramethylthiuram disulfide, tetraethylthiuram disulfide, tetrapropylthiuram disulfide, tetraisopropylthiuram disulfide, tetrabutylthiuram disulfide, tetrapentylthiuram disulfide, tetrahexylthiuram disulfide, tetraheptylthiuram disulfide, tetraoctylthiuram disulfide, tetranonylthiuram disulfide, tetradecylthiuram disulfide, tetradodecylthiuram disulfide, tetrastearylthiuram disulfide, tetrabenzylthiuram disulfide, tetrakis(2-ethylhexyl)thiuram disulfide, tetramethylthiuram monosulfide, tetraethylthiuram monosulfide, tetrapropylthiuram monosulfide, tetraisopropylthiuram monosulfide, tetrabutylthiuram monosulfide, tetrapentylthiuram monosulfide, tetrahexylthiuram monosulfide, tetraheptylthiuram monosulfide, tetraoctylthiuram monosulfide, tetranonylthiurammonosulfide, tetradecylthiuram monosulfide, tetradodecylthiuram monosulfide, tetrastearylthiuram monosulfide, tetrabenzylthiuram monosulfide, dipentamethylthiuram tetrasulfide, etc. Of those, preferred are tetrakis(2-ethylhexyl)thiuram disulfide and tetrabenzylthiuram disulfide, as having high reactivity.

The thioureas for use in the rubber composition production method of the present invention include N,N'-diphenylthiourea, trimethylthiourea, N,N'-diethylthiourea, N,N'-dimethylthiourea, N,N'-dibutylthiourea, ethylenethiourea, N,N'-diisopropylthiourea, N,N'-dicyclohexylthiourea, 1,3-di(o-tolyl)thiourea, 1,3-di(p-tolyl)thiourea, 1,1-diphenyl-2-thiourea, 2,5-dithiobiurea, guanylthiourea, 1-(1-naphthyl)-2-thiourea, 1-phenyl-2-thiourea, p-tolylthiourea, o-tolylthiourea, etc. Of those, preferred are N,N'-diethylthiourea, trimethylthiourea, N,N'-diphenylthiourea and N,N'-dimethylthiourea, as having high reactivity.

The dithiocarbamate salts for use in the rubber composition production method of the present invention include zinc dimethyldithiocarbamate, zinc diethyldithiocarbamate, zinc dipropyldithiocarbamate, zinc diisopropyldithiocarbamate, zinc dibutyldithiocarbamate, zinc dipentyldithiocarbamate, zinc dihexyldithiocarbamate, zinc diheptyldithiocarbamate, zinc dioctyldithiocarbamate, zinc di(2-ethylhexyl)dithiocarbamate, zinc didecyldithiocarbamate, zinc didodecyldithiocarbamate, zinc N-pent amethylenedithiocarbamate, zinc N-ethyl-N-phenyldithiocarbamate, zinc dibenzyldithiocarbamate, copper dimethyldithiocarbamate, copper diethyldithiocarbamate, copper dipropyldithiocarbamate, copper diisopropyldithiocarbamate, copper dibutyldithiocarbamate, copper dipentyldithiocarbamate, copper dihexyldithiocarbamate, copper diheptyldithiocarbamate, copper dioctyldithiocarbamate, copper di(2-ethylhexyl)dithiocarbamate, copper didecyldithiocarbamate, copper didodecyldithiocarbamate, copper N-pent amethylenedithiocarbamate, copper dibenzyldithiocarbamate, sodium dimethyldithiocarbamate, sodium diethyldithiocarbamate, sodium dipropyldithiocarbamate, sodium diisopropyldithiocarbamate, sodium dibutyldithiocarbamate, sodium dipentyldithiocarbamate, sodium dihexyldithiocarbamate, sodium diheptyldithiocarbamate, sodium dioctyldithiocarbamate, sodium di(2-ethylhexyl)dithiocarbamate, sodium didecyldithiocarbamate, sodium didodecyldithiocarbamate, sodium N-pentamethylenedithiocarbamate, sodium dibenzyldithiocarbamate, ferric dimethyldithiocarbamate, ferric diethyldithiocarbamate, ferric dipropyldithiocarbamate, ferric diisopropyldithiocarbamate, ferric dibutyldithiocarbamate, ferric dipentyldithiocarbamate, ferric dihexyldithiocarbamate, ferric diheptyldithiocarbamate, ferric dioctyldithiocarbamate, ferric di(2-ethylhexyl)dithiocarbamate, ferric didecyldithiocarbamate, ferric didodecyldithiocarbamate, ferric N-pentamethylenedithiocarbamate, ferric dibenzyldithiocarbamate, etc. Of those, preferred are zinc dibenzyldithiocarbamate, zinc N-ethyl-N-phenyldithiocarbamate, zinc dimethyldithiocarbamate and copper dimethyldithiocarbamate, as having high reactivity.

The xanthate salts for use in the rubber composition production method of the present invention include zinc methylxanthate, zinc ethylxanthate, zinc propylxanthate, zinc isopropylxanthate, zinc butylxanthate, zinc pentylxanthate, zinc hexylxanthate, zinc heptylxanthate, zinc octylxanthate, zinc 2-ethylhexylxanthate, zinc decylxanthate, zinc dodecylxanthate, potassium methylxanthate, potassium ethylxanthate, potassium propylxanthate, potassium isopropylxanthate, potassium butylxanthate, potassium pentylxanthate, potassium hexylxanthate, potassium heptylxanthate, potassium octylxanthate, potassium 2-ethylhexylxanthate, potassium decylxanthate, potassium dodecylxanthate, sodium methylxanthate, sodium ethylxanthate, sodium propylxanthate, sodium isopropylxanthate, sodium butylxanthate, sodium pentylxanthate, sodium hexylxanthate, sodium heptylxanthate, sodium octylxanthate, sodium 2-ethylhexylxanthate, sodium decylxanthate, sodium dodecylxanthate, etc. Of those, preferred is zinc isopropylxanthate, as having high reactivity.

In the first stage of kneading in the present invention, preferably, the number of molecules (molar number) of the vulcanization promoter (D) in the rubber composition is from 0.1 to 1.0 time the number of molecules (molar number) of the silane coupling agent (C) therein. When the molar number is at least 0.1 times, then the silane coupling agent (C) can be fully activated; and when at most 1.0 time, then the agent would not have any significant influence on the vulcanization speed. More preferably, the number of molecules (molar number) of the vulcanization promoter (D) is from 0.2 to 0.6 times the number of molecules (molar number) of the silane coupling agent (C).

The vulcanization promoter (D) may act also as a promoter for sulfur vulcanization, and if desired, a suitable amount thereof may be incorporated also in the final stage of kneading. In case where a vulcanization promoter is incorporated in the final stage of kneading, the agent is not limited to the vulcanization promoter (D) of the present invention but may be any known vulcanization promoter.

[Rubber Component (A)]

As the synthetic dienic rubber of the rubber component (A) for use in the rubber composition production method of the present invention, usable here are styrene-butadiene copolymer rubber (SBR), polybutadiene rubber (BR), polyisoprene rubber (IR), butyl rubber (IIR), ethylene-propylene-diene tercopolymer rubber (EPDM), etc. One or more different types of natural rubbers and synthetic dienic rubbers may be used here either singly or as combined.

As the inorganic filler (B) for use in the rubber composition production method of the present invention, usable are silica and an inorganic compound represented by the following general formula (VIII):

(VIII)

In the general formula (VIII), $M^1$ represents at least one selected from a metal selected from aluminium, magnesium, titanium, calcium and zirconium, and oxides or hydroxides of those metals, their hydrates, or carbonates of the metals; d, x, y and z each indicates an integer of from 1 to 5, an integer of from 0 to 10, an integer of from 2 to 5, and an integer of from 0 to 10, respectively.

In the general formula (VIII), when x and z are both 0, then the inorganic compound is at least one metal selected from aluminium, magnesium, titanium, calcium and zirconium, or a metal oxide or metal hydroxide thereof.

In the present invention, silica is preferred as the inorganic filler (B) from the viewpoint of satisfying both low rolling property and abrasion resistance. As silica, any commercially-available one is usable here; and above all, preferred is wet silica, dry silica or colloidal silica, and more preferred is wet silica. Preferably, the BET specific surface area (as measured according to ISO 5794/1) of silica for use herein is from 40 to 350 m$^2$/g. Silica of which the BET specific surface area falls within the range is advantageous in that it satisfies both rubber-reinforcing capability and dispersibility in rubber component. From this viewpoint, silica of which the BET specific surface area falls within a range of from 80 to 350 m$^2$/g is more preferred; silica of which the BET specific surface area falls within a range of more than 130 m$^2$/g to 350 m$^2$/g is even more preferred; and silica of which the BET specific surface area falls within a range of from 135 to 350 m$^2$/g is even more preferred. As silicas of those types, usable here are commercial products of Tosoh Silica's trade names "Nipseal AQ" (BET specific surface area=205 m$^2$/g) and "Nipseal KQ" (BET specific surface area=240 m$^2$/g); Degussa's trade name "Ultrasil VN3" (BET specific surface area=175 m$^2$/g), etc.

As the inorganic compound represented by the general formula (VIII), usable here are alumina ($Al_2O_3$) such as γ-alumina, α-alumina, etc.; alumina monohydrate ($Al_2O_3.H_2O$) such as boehmite, diaspore, etc.; aluminium hydroxide [Al(OH)$_3$] such as gypsite, bayerite, etc.; aluminium carbonate [$Al_2(CO_3)_2$], magnesium hydroxide [$Mg(OH)_2$], magnesium oxide (MgO), magnesium carbonate ($MgCO_3$), talc ($3MgO.4SiO_2.H_2O$), attapulgite ($5MgO.8SiO_2.9H_2O$), titanium white ($TiO_2$), titanium black ($TiO_{2n-1}$), calcium oxide (CaO), calcium hydroxide [$Ca(OH)_2$], aluminium magnesium oxide ($MgO.Al_2O_3$), clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminium silicate ($Al_2SiO_5$, $Al_4.3SiO_4.5H_2O$, etc.), magnesium silicate ($Mg_2SiO_4$, $MgSiO_3$, etc.), calcium silicate ($Ca_2.SiO_4$, etc.), aluminium calcium silicate ($Al_2O_3.CaO.2SiO_2$, etc.), magnesium calcium silicate ($CaMgSiO_4$), calcium carbonate ($CaCO_3$), zirconium oxide ($ZrO_2$), zirconium hydroxide [$ZrO(OH)_2$.nH$_2$O], zirconium carbonate [$Zr(CO_3)_2$]; as well as crystalline aluminosilicate salts containing a charge-correcting hydrogen, alkali metal or alkaline earth metal such as various types of zeolite. Preferably, $M^1$ in the general formula (VIII) is at least one selected from aluminium metal, aluminium oxide or hydroxide, and their hydrates, or aluminium carbonate.

One or more different types of the inorganic compounds of the general formula (VIII) may be used here either singly or as combined. The mean particle size of the inorganic compound is preferably within a range of from 0.01 to 10 μm from the viewpoint of the balance of kneading workability, abrasion resistance and wet grip performance, and more preferably within a range of from 0.05 to 5 μm.

As the inorganic filler (B) in the present invention, silica alone may be used, or silica as combined with at least one inorganic compound of the general formula (VIII) may be used.

If desired, the filler in the rubber composition in the present invention may contain carbon black in addition to the above-mentioned inorganic filler (B). Containing carbon black, the filler enjoys the effect of lowering the electric resistance of the rubber composition to thereby prevent static electrification thereof. Carbon black for use herein is not specifically defined. For example, preferred is use of high, middle or low-structure SAF, ISAF, IISAF, N339, HAF, FEF, GPF, SRF-grade carbon black; and more preferred is use of SAF, ISAF, IISAF, N339, HAF, FEF-grade carbon black. Preferably, the nitrogen adsorption specific surface area ($N_2SA$, as measured according to JIS K 6217-2:2001) of such carbon black is from 30 to 250 $m^2/g$. One alone or two or more different types of such carbon black may be used here either singly or as combined. In the present invention, the inorganic filler (B) does not contain carbon black.

The inorganic filler (B) in the rubber composition in the present invention is preferably in an amount of from 20 to 120 parts by mass relative to 100 parts by mass of the rubber component (A). When the amount is at least 20 parts by mass, then it is favorable from the viewpoint of securing wet performance; and when at most 120 parts by mass, then it is favorable from the viewpoint of reducing rolling resistance. Further, the amount is more preferably from 30 to 100 parts by mass.

Also preferably, the filler in the rubber composition in the present invention is in an amount of from 20 to 150 parts by mass relative to 100 parts by mass of the rubber component (A). When the amount is at least 20 parts by mass, then it is favorable from the viewpoint of enhancing rubber composition reinforcing capability; and when at most 150 parts by mass, then it is favorable from the viewpoint of reducing rolling resistance.

In the filler, preferably, the amount of the inorganic filler (B) is at least 30% by mass from the viewpoint of satisfying both wet performance and reduced rolling resistance, more preferably at least 40% by mass, and even more preferably at least 70% by mass.

In case where silica is used as the inorganic filler (B), it is desirable that silica accounts for at least 30% by mass of the filler, more preferably at least 35% by mass.

[Organic Acid Compound]

In the production method of the present invention, it is desirable that the number of molecules (molar number) of the organic acid compound in the rubber composition in the first stage of kneading is at most 1.5 times the number of molecules (molar number) of the vulcanization promoter (D) therein. This is for favorably preventing the effect of enhancing the coupling function activity by incorporation of the vulcanization promoter (D), from lowering.

The organic acid compound to be incorporated in the rubber composition in the present invention includes organic acids, for example, saturated fatty acids and unsaturated fatty acids such as stearic acid, palmitic acid, myristic acid, lauric acid, arachidic acid, behenic acid, lignoceric acid, capric acid, pelargonic acid, caprylic acid, enanthic acid, caproic acid, oleic acid, vaccenic acid, linolic acid, linolenic acid, nervonic acid, etc.; as well as resin acids such as rosin acid, modified rosin acid, etc.; and esters of the above-mentioned saturated fatty acids, unsaturated fatty acids and resin acids, etc.

In the present invention, preferably, at least 50 mol % of the organic acid compound in the rubber composition in the first stage of kneading is stearic acid, in order that the vulcanization promoter must fully exhibit its function.

In case where the rubber component (A) contains at least one selected from emulsion-polymerized styrene-butadiene copolymer and natural rubber, preferably, at least 50 mol % of the organic acid compound (E) in the rubber composition in the first stage of kneading is at least one compound selected from rosin acids and fatty acids contained in at least one selected from the emulsion-polymerized styrene-butadiene copolymer and the natural rubber. The rosin acids (including modified rosin acids) and fatty acids contained in an emulsion-polymerized styrene-butadiene copolymer are derived from the emulsifying agent necessary for producing the emulsion-polymerized styrene-butadiene copolymer. Natural rubbers generally contain a small amount of fatty acids.

In the rubber composition production method of the present invention, various additives that are generally incorporated in a rubber composition, for example, a vulcanization activator such as zinc flower or the like, an antiaging agent and others may be optionally added and kneaded in the first stage or the final stage of kneading, or in the intermediate stage between the first stage and the final stage.

As the kneading apparatus for the production method of the present invention, usable is any of a Banbury mixer, a roll, an intensive mixer, a kneader, a double-screw extruder, etc.

EXAMPLES

The present invention is described in more detail with reference to the following Examples; however, the present invention is not limited at all by the following Examples.

Low-heat-generating property (tan δ index) was evaluated according to the following method.

Low-Heat-Generation Property (tan δ Index)

Using a viscoelasticity measuring device (by Rheometric), tan δ of the rubber composition sample was measured at a temperature of 60° C., at a dynamic strain of 5% and at a frequency of 15 Hz. Based on the reciprocal of tan δ in Comparative Example 1, 10 or 17, as referred to 100, the data were expressed as index indication according to the following formula. The samples having a larger index value have a better low-heat-generation property and have a smaller hysteresis loss.

Low-Heat-Generation Index={(tan δ of vulcanized rubber composition of Comparative Example 1, 8, 15, 45, 51, 57 or 63)/(tan δ of vulcanized rubber composition tested)}×100

Production Example 1

Production of Silane Coupling Agent Represented by Average Compositional Formula $(CH_3CH_2O)_3Si—(CH_2)_3—S—(CH_2)_6—S_{2.5}—(CH_2)_6—S—(CH_2)_3—Si(OCH_2CH_3)_3$ 119 g (0.5 mol) of 3-mercaptopropyltriethoxysilane was put into a 2-liter separable flask equipped with a nitrogen-introducing duct, a thermometer, a Dimroth condenser and a dropping funnel, and with stirring, 151.2 g (0.45 mol) of an ethanol solution of sodium ethoxide having an effective ingredient concentration of 20% by mass was added thereto. Subsequently, this was heated up to 80° C. and stirred for 3 hours. Afterwards, this was cooled and transferred into a dropping funnel.

Next, 69.75 g (0.45 mol) of 1,6-dichlorohexane was put into the same separable flask as above, heated up to 80° C., and the reaction product of 3-mercaptopropyltriethoxysilane and sodium ethoxide was slowly and dropwise added thereto. After the addition, this was stirred for 5 hours at 80° C. Subsequently, this was cooled, and salt was separated from the obtained solution through filtration, and ethanol and excessive 1,6-dichlorohexane were removed therefrom through reduced-pressure distillation. The obtained solution was distilled under reduced pressure to give 137.7 g of a colorless transparent liquid having a boiling point of 148 to 150° C./0.005 Torr (0.67 Pa). As a result of IR analysis, $^1$H-NMR analysis and mass spectrometry analysis (MS analysis), the product was a compound represented by $(CH_3CH_2O)_3Si-(CH_2)_3-S-(CH_2)_6-Cl$. Through gas chromatography analysis (GC analysis), the purity of the compound was 97.5%.

Next, 80 g of ethanol, 5.46 g (0.07 mol) of anhydrous sodium sulfide and 3.36 g (0.105 mol) of sulfur were put into a 0.5-liter separable flask similar to the above, and heated up to 80° C. With stirring the solution, 49.91 g (0.14 mol) of the above $(CH_3CH_2O)_3Si-(CH_2)_3-S-(CH_2)_6-Cl$ was gradually and dropwise added thereto. After the addition, this was stirred for 10 hours at 80° C. After the stirring, this was cooled, the formed salt was taken out through filtration, and then the solvent ethanol was evaporated away under reduced pressure.

The obtained, red-brown transparent solution was analyzed through IR analysis, $^1$H-NMR analysis and ultra-critical chromatography analysis, which confirmed that the product is a compound represented by an average compositional formula, $(CH_3CH_2O)_3Si-(CH_2)_3-S-(CH_2)_6-S_{2.5}-(CH_2)_6-S-(CH_2)_3-Si(OCH_2CH_3)_3$. In GPC analysis, the purity of the product was 85.2%.

Examples 1 to 6 and Comparative Examples 1 to 6

According to the compositional formulation and the kneading method shown in Table 1, the ingredients were kneaded in a Banbury mixer in such a controlled manner that, after addition of the rubber component, silica, the silane coupling agent and others in the first stage of kneading, the time (second) before addition of 1,3-diphenylguanidine and the temperature (° C.) of the rubber composition at addition of 1,3-diphenylguanidine could be as in Table 1, or in the first stage of kneading, 1,3-diphenylguanidine was not added and the ingredients were kneaded in the Banbury mixer, thereby preparing 12 types of rubber compositions. The obtained, 12 rubber compositions were evaluated in point of the low-heat-generation property (tan δ index) thereof according to the above-mentioned method. The results are shown in Table 1.

In Tables 1 to 32, "according to kneading method A" means that, in the first stage of kneading the rubber composition, the rubber component (A), the inorganic filler (B) and the silane coupling agent (C) were kneaded, and then the vulcanization promoter (D) was added thereto on the way of the first stage, and further kneaded. "According to kneading method B" means that, in the first stage of kneading the rubber composition, the inorganic filler (B), the silane coupling agent (C) and the vulcanization promoter (D) were added all together and kneaded.

TABLE 1

| | | part by mass | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|---|
| Formulation | First Stage of Kneading | Emulsion-Polymerized SBR-A *1 | 100 | 100 | 100 | 100 | 100 | 100 | 100 | 100 | 100 | 100 | 100 | 100 |
| | | Carbon Black N220 *2 | 10 | 10 | 10 | — | 10 | 10 | 10 | 10 | 10 | 10 | 10 | — |
| | | Silica *3 | 50 | 50 | 50 | 60 | 50 | 50 | 50 | 50 | 50 | 50 | 50 | 60 |
| | | Silane Coupling Agent Si75 *4 | 4.0 | 4.0 | 4.0 | 4.8 | 4.0 | 4.0 | 4.0 | — | 4.0 | 4.0 | 4.0 | 4.8 |
| | | Aromatic Oil | 30 | 30 | 30 | 30 | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 | — | — | 2.0 | 2.0 |
| | | Antiaging Agent 6PPD *5 | 1.0 | 1.0 | 1.0 | 1.0 | 1.0 | 1.0 | 1.0 | 1.0 | — | — | 1.0 | 1.0 |
| | | 1,3-Diphenylguanidine *6 according to kneading method A | 1.0 | 0.3 | 1.5 | 1.0 | 0.1 | 2.5 | — | — | — | — | — | — |
| | | 1,3-Diphenylguanidine *6 according to kneading method B | — | — | — | — | — | — | — | — | — | 1.0 | 1.0 | — |
| | Final Stage of Kneading | Stearic Acid | — | — | — | — | — | — | — | — | 2.0 | 2.0 | — | — |
| | | Antiaging Agent 6PPD *5 | — | — | — | — | — | — | — | — | 1.0 | 1.0 | — | — |
| | | Antiaging Agent TMDQ *7 | 1.0 | 1.0 | 1.0 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 |
| Time (sec) until addition of 1,3-diphenylguanidine after addition of silica and silane coupling agent | | | 90 | 90 | 90 | 90 | 90 | 90 | — | — | — | 0 | 0 | — |
| Temperature (° C.) of rubber composition at addition of 1,3-diphenylguanidine | | | 130 | 130 | 130 | 130 | 130 | 130 | — | — | — | 70 | 70 | — |
| Vulcanizate Physical Property | | Low-Heat-Generation Property (tan δ index) | 138 | 135 | 136 | 144 | 119 | 133 | 100 | 101 | 104 | 107 | 104 | 102 |

[Notes]
*1: JSR's emulsion-polymerized styrene-butadiene copolymer rubber (SBR), trade name "#1500"
*2: N220 (ISAF), Asahi Carbon's trade name "#80"
*3: Tosoh Silica's trade name "Nipseal AQ", BET specific surface area 205 m$^2$/g
*4: Bis(3-triethoxysilylpropyl) disulfide (mean sulfur chain length: 2.35), Evonik's silane coupling agent, trade name "Si75" (registered trademark)
*5: N-(1,3-dimethylbutyl)-N'-phenyl-p-phenylenediamine, by Ouchi Shinko Chemical, trade name "Noclac 6C"
*6: 1,3-Diphenylguanidine, Sanshin Chemical's trade name "Sanceler D"
*7: 2,2,4-Trimethyl-1,2-dihydroquinoline polymer, Ouchi Shinko Chemical's trade name "Noclac 224"
*8: Di-2-benzothiazolyl disulfide, Sanshin Chemical's trade name "Sanceler DM"
*9: N-tert-butyl-2-benzothiazolylsulfenamide, Sanshin Chemical's trade name "Sanceler NS"

Examples 7 to 14, and Comparative Example 7

Next, according to the compositional formulation and the kneading method shown in Table 2, the ingredients were kneaded in a Banbury mixer in such a controlled manner that, after addition of the rubber component, silica, the silane coupling agent and others in the first stage of kneading, the time (second) before addition of 1,3-diphenylguanidine and the temperature (° C.) of the rubber composition at addition of 1,3-diphenylguanidine could be as in Table 2, or in the first stage of kneading, 1,3-diphenylguanidine was not added and the ingredients were kneaded in the Banbury mixer, thereby preparing 9 types of rubber compositions. The obtained, 9 rubber compositions were evaluated in point of the low-heat-generation property (tan δ index) thereof according to the above-mentioned method. The results are shown in Table 2. For comparison, the data of Example 1 and Comparative Example 1 are again shown therein.

TABLE 2

| | | | Example | | | | | | | | | Comparative Example | |
|---|---|---|---|---|---|---|---|---|---|---|---|---|---|
| | part by mass | | 1 | 7 | 8 | 9 | 10 | 11 | 12 | 13 | 14 | 1 | 7 |
| Formulation | First Stage of Kneading | Emulsion-Polymerized SBR-A *1 | 100 | 100 | 100 | 100 | 100 | 100 | 100 | — | — | 100 | — |
| | | Solution-Polymerized SBR-B *10 | — | — | — | — | — | — | — | 100 | 100 | — | 100 |
| | | Carbon Black N220 *2 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 | 2.0 | 2.0 | 2.0 |
| | | Antiaging Agent 6PPD *5 | 1.0 | 1.0 | 1.0 | 1.0 | 1.0 | 1.0 | 1.0 | 1.0 | 1.0 | 1.0 | 1.0 |
| | | 1,3-Diphenylguanidine *6 according to kneading method A | 1.0 | 1.0 | 1.0 | 1.0 | 1.0 | 1.0 | 1.0 | 1.0 | 1.0 | — | — |
| | | 1,3-Diphenylguanidine *6 according to kneading method B | — | — | — | — | — | — | — | — | — | — | — |
| | Final Stage of Kneading | Stearic Acid | — | — | — | — | — | — | — | — | — | — | — |
| | | Antiaging Agent 6PPD *5 | — | — | — | — | — | — | — | — | — | — | — |
| | | Antiaging Agent TMDQ *7 | 1.0 | 1.0 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 |
| Time (sec) until addition of 1,3-diphenylguanidine after addition of silica and silane coupling agent | | | 90 | 90 | 60 | 30 | 60 | 120 | 120 | 90 | 60 | — | — |
| Temperature (° C.) of rubber composition at addition of 1,3-diphenylguanidine | | | 130 | 145 | 120 | 95 | 130 | 130 | 145 | 130 | 120 | — | — |
| Vulcanizate Physical Property | Low-Heat-Generation Property (tan δ index) | | 138 | 144 | 130 | 125 | 135 | 132 | 138 | 145 | 135 | 100 | 102 |

[Notes]
*1 to *9 are all the same as in Table 1.
*10: Asahi Kasei's solution-polymerized styrene-butadiene copolymer rubber (SBR), trade name "Toughden 2000"

Examples 15 to 21, and Comparative Examples 8 to 14

According to the compositional formulation and the kneading method shown in Table 3, the ingredients were kneaded in a Banbury mixer in such a controlled manner that, after addition of the rubber component, silica, the silane coupling agent and others in the first stage of kneading, the time (second) before addition of 1,3-diphenylguanidine and the temperature (° C.) of the rubber composition at addition of 1,3-diphenylguanidine could be as in Table 3, or in the first stage of kneading, 1,3-diphenylguanidine was not added and the ingredients were kneaded in the Banbury mixer, thereby preparing 14 types of rubber compositions. The obtained, 14 rubber compositions were evaluated in point of the low-heat-generation property (tan δ index) thereof according to the above-mentioned method. The results are shown in Table 3.

TABLE 3

| | | | Example | | | | | | | Comparative Example | | | | | | |
|---|---|---|---|---|---|---|---|---|---|---|---|---|---|---|---|---|
| | part by mass | | 15 | 16 | 17 | 18 | 19 | 20 | 21 | 8 | 9 | 10 | 11 | 12 | 13 | 14 |
| Formulation | First Stage of Kneading | Emulsion-Polymerized SBR-A *1 | 75 | 50 | 25 | 80 | — | 80 | — | 75 | 50 | 25 | 80 | — | 80 | — |
| | | Solution-Polymerized SBR-B *10 | 25 | 50 | 75 | — | 80 | — | 80 | 25 | 50 | 75 | — | 80 | — | 80 |

TABLE 3-continued

| part by mass | | Example | | | | | | | Comparative Example | | | | | | |
|---|---|---|---|---|---|---|---|---|---|---|---|---|---|---|---|
| | | 15 | 16 | 17 | 18 | 19 | 20 | 21 | 8 | 9 | 10 | 11 | 12 | 13 | 14 |
| | Natural rubber *11 | — | — | — | 20 | 20 | — | — | — | — | — | 20 | 20 | — | — |
| | Unmodified BR *12 | — | — | — | — | — | 20 | 20 | — | — | — | — | — | 20 | 20 |
| | Carbon Black N220 *2 | 10 | 10 | 10 | 10 | 10 | 10 | 10 | 10 | 10 | 10 | 10 | 10 | 10 | 10 |
| | Silica *3 | 50 | 50 | 50 | 50 | 50 | 50 | 50 | 50 | 50 | 50 | 50 | 50 | 50 | 50 |
| | Silane Coupling Agent Si75 *4 | 4.0 | 4.0 | 4.0 | 4.0 | 4.0 | 4.0 | 4.0 | 4.0 | 4.0 | 4.0 | 4.0 | 4.0 | 4.0 | 4.0 |
| | Aromatic Oil | 30 | 30 | 30 | 30 | 30 | 30 | 30 | 30 | 30 | 30 | 30 | 30 | 30 | 30 |
| | Stearic Acid | 2.0 | 2.0 | 2.0 | 2.0 | 2.0 | 2.0 | 2.0 | 2.0 | 2.0 | 2.0 | 2.0 | 2.0 | 2.0 | 2.0 |
| | Antiaging Agent 6PPD *5 | 1.0 | 1.0 | 1.0 | 1.0 | 1.0 | 1.0 | 1.0 | 1.0 | 1.0 | 1.0 | 1.0 | 1.0 | 1.0 | 1.0 |
| | 1,3-Diphenylguanidine *6 according to kneading method A | 1.0 | 1.0 | 1.0 | 1.0 | 1.0 | 1.0 | 1.0 | — | — | — | — | — | — | — |
| | 1,3-Diphenylguanidine *6 according to kneading method B | — | — | — | — | — | — | — | — | — | — | — | — | — | — |
| Final Stage of Kneading | Antiaging Agent TMDQ *7 | 1.0 | 1.0 | 1.0 | 1.0 | 1.0 | 1.0 | 1.0 | 1.0 | 1.0 | 1.0 | 1.0 | 1.0 | 1.0 | 1.0 |
| | Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 |
| | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 | 1.0 | 1.0 |
| | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 |
| Time (sec) until addition of 1,3-diphenylguanidine after addition of silica and silane coupling agent | | 90 | 90 | 90 | 90 | 90 | 90 | 90 | — | — | — | — | — | — | — |
| Temperature (° C.) of rubber composition at addition of 1,3-diphenylguanidine | | 130 | 130 | 130 | 130 | 130 | 130 | 130 | — | — | — | — | — | — | — |
| Vulcanizate Physical Property | Low-Heat-Generation Property (tanδ index) | 135 | 132 | 125 | 142 | 148 | 145 | 152 | 100 | 100 | 100 | 110 | 111 | 114 | 114 |

[Notes]
*2 to *10 are all the same as in Table 1 and Table 2.

Examples 22 to 29, and Comparative Examples 15 to 18

According to the compositional formulation and the kneading method shown in Table 4, the ingredients were kneaded in a Banbury mixer in such a controlled manner that, after addition of the rubber component, silica, the silane coupling agent and others in the first stage of kneading, the time (second) before addition of 1,3-diphenylguanidine and the temperature (° C.) of the rubber composition at addition of 1,3-diphenylguanidine could be as in Table 4, or in the first stage of kneading, 1,3-diphenylguanidine was not added and the ingredients were kneaded in the Banbury mixer, thereby preparing 12 types of rubber compositions. The obtained, 12 rubber compositions were evaluated in point of the low-heat-generation property (tan δ index) thereof according to the above-mentioned method. The results are shown in Table 4.

TABLE 4

| part by mass | | | Example | | | | | |
|---|---|---|---|---|---|---|---|---|
| | | | 22 | 23 | 24 | 25 | 26 | 27 |
| Formulation | First Stage of Kneading | Emulsion-Polymerized SBR-C *13 | 68.75 | 68.75 | 68.75 | 68.75 | 68.75 | 68.75 |
| | | Solution-Polymerized SBR-D *14 | 68.75 | 68.75 | 68.75 | 68.75 | 68.75 | 68.75 |
| | | Carbon Black N220 *2 | 10 | 10 | 10 | 10 | 10 | 10 |
| | | Silica *3 | 80 | 80 | 80 | 80 | 80 | 80 |
| | | Silane Coupling Agent Si75 *4 | 6.5 | — | — | — | 6.5 | — |
| | | Silane Coupling Agent NXT *15 | — | 6.5 | — | — | — | 6.5 |
| | | Silane Coupling Agent NXT-Z *16 | — | — | 6.5 | — | — | — |
| | | Silane Coupling Agent *17 | — | — | — | 6.5 | — | — |
| | | Aromatic Oil | 5.0 | 5.0 | 5.0 | 5.0 | 5.0 | 5.0 |
| | | Stearic Acid | 2.0 | 2.0 | 2.0 | 2.0 | — | — |
| | | Antiaging Agent 6PPD *5 | 1.0 | 1.0 | 1.0 | 1.0 | — | — |
| | | 1,3-Diphenylguanidine *6 according to kneading method A | 1.0 | 1.0 | 1.0 | 1.0 | 1.0 | 1.0 |
| | | 1,3-Diphenylguanidine *6 according to kneading method B | — | — | — | — | — | — |

TABLE 4-continued

| | | | | | | | |
|---|---|---|---|---|---|---|---|
| Final Stage of Kneading | Stearic Acid | — | — | — | — | 2.0 | 2.0 |
| | Antiaging Agent 6PPD *5 | — | — | — | — | 1.0 | 1.0 |
| | Zinc Flower | 3.0 | 3.0 | 3.0 | 3.0 | 3.0 | 3.0 |
| | 1,3-Diphenylguanidine *6 | 1.0 | 1.0 | 1.0 | 1.0 | 1.0 | 1.0 |
| | Vulcanization Promoter MBTS *8 | 0.8 | 0.8 | 0.8 | 0.8 | 0.8 | 0.8 |
| | Vulcanization Promoter CBS *18 | 1.5 | 1.5 | 1.5 | 1.5 | 1.5 | 1.5 |
| | Sulfur | 1.5 | 1.5 | 1.5 | 1.5 | 1.5 | 1.5 |
| Time (sec) until addition of 1,3-diphenylguanidine after addition of silica and silane coupling agent | | 90 | 90 | 90 | 90 | 90 | 90 |
| Temperature (° C.) of rubber composition at addition of 1,3-diphenylguanidine | | 130 | 130 | 130 | 130 | 130 | 130 |
| Vulcanizate Physical Property | Low-Heat-Generation Property (tanδ index) | 130 | 125 | 122 | 138 | 138 | 126 |

| | | | Example | | Comparative Example | | | |
|---|---|---|---|---|---|---|---|---|
| | | part by mass | 28 | 29 | 15 | 16 | 17 | 18 |
| Formulation | First Stage of Kneading | Emulsion-Polymerized SBR-C *13 | 68.75 | 68.75 | 68.75 | 68.75 | 68.75 | 68.75 |
| | | Solution-Polymerized SBR-D *14 | 68.75 | 68.75 | 68.75 | 68.75 | 68.75 | 68.75 |
| | | Carbon Black N220 *2 | 10 | 10 | 10 | 10 | 10 | 10 |
| | | Silica *3 | 80 | 80 | 80 | 80 | 80 | 80 |
| | | Silane Coupling Agent Si75 *4 | — | — | 6.5 | — | — | — |
| | | Silane Coupling Agent NXT *15 | — | — | — | 6.5 | — | — |
| | | Silane Coupling Agent NXT-Z *16 | 6.5 | — | — | — | 6.5 | — |
| | | Silane Coupling Agent *17 | — | 6.5 | — | — | — | 6.5 |
| | | Aromatic Oil | 5.0 | 5.0 | 5.0 | 5.0 | 5.0 | 5.0 |
| | | Stearic Acid | — | — | 2.0 | 2.0 | 2.0 | 2.0 |
| | | Antiaging Agent 6PPD *5 | — | — | 1.0 | 1.0 | 1.0 | 1.0 |
| | | 1,3-Diphenylguanidine *6 according to kneading method A | 1.0 | 1.0 | — | — | — | — |
| | | 1,3-Diphenylguanidine *6 according to kneading method B | — | — | — | — | — | — |
| | Final Stage of Kneading | Stearic Acid | 2.0 | 2.0 | — | — | — | — |
| | | Antiaging Agent 6PPD *5 | 1.0 | 1.0 | — | — | — | — |
| | | Zinc Flower | 3.0 | 3.0 | 3.0 | 3.0 | 3.0 | 3.0 |
| | | 1,3-Diphenylguanidine *6 | 1.0 | 1.0 | 1.0 | 1.0 | 1.0 | 1.0 |
| | | Vulcanization Promoter MBTS *8 | 0.8 | 0.8 | 0.8 | 0.8 | 0.8 | 0.8 |
| | | Vulcanization Promoter CBS *18 | 1.5 | 1.5 | 1.5 | 1.5 | 1.5 | 1.5 |
| | | Sulfur | 1.5 | 1.5 | 1.5 | 1.5 | 1.5 | 1.5 |
| Time (sec) until addition of 1,3-diphenylguanidine after addition of silica and silane coupling agent | | | 90 | 90 | — | — | — | — |
| Temperature (° C.) of rubber composition at addition of 1,3-diphenylguanidine | | | 130 | 130 | — | — | — | — |
| Vulcanizate Physical Property | | Low-Heat-Generation Property (tanδ index) | 124 | 145 | 100 | 115 | 110 | 112 |

[Notes]
*1 to *9 are all the same as in Table 1.
*13: JSR's emulsion-polymerized styrene-butadiene copolymer rubber (SBR), trade name "#1712"
*14: Asahi Kasei's solution-polymerized styrene-butadiene copolymer rubber (SBR), trade name "Toughden 3835"
*15: 3-Octanoylthiopropyltriethoxysilane, Momentive Performance Materials' trade name "NXT Silane" (registered trademark)
*13: Silane coupling agent represented by the chemical formula (VII), Momentive Performance Materials' trade name "NXT-Z" (registered trademark)
*17: Silane coupling agent represented by the following average compositional formula: $(CH_3CH_2O)_3Si$—$(CH_2)_3$—$S$—$(CH_2)_6$—$S_{2.5}$—$(CH_2)_6$—$S$—$(CH_2)_3$—$Si(OCH_2CH_3)_3$, which was prepared in Production Example 1
*18: N-cyclohexyl-2-benzothiazolylsulfenamide, Ouchi Shinko Chemical's trade name "Noclac CZ"

Examples 30 and 31, and Comparative Examples 19 to 21

According to the compositional formulation and the kneading method shown in Table 5, the ingredients were kneaded in a Banbury mixer in such a controlled manner that, after addition of the rubber component, silica, the silane coupling agent and others in the first stage of kneading, the time (second) before addition of guanidines and the temperature (° C.) of the rubber composition at addition of guanidines could be as in Table 5, or in the first stage of kneading, guanidines were not added and the ingredients were kneaded in the Banbury mixer, thereby preparing 5 types of rubber compositions. The obtained, 5 rubber compositions were evaluated in point of the low-heat-generation property (tan δ index) thereof according to the above-mentioned method. For comparison, the data of Example 22 and Comparative Example 15 are again shown here. The results are shown in Table 5.

TABLE 5

| | | | Example | | | Comparative Example | | | |
|---|---|---|---|---|---|---|---|---|---|
| | | part by mass | 22 | 30 | 31 | 15 | 19 | 20 | 21 |
| Formulation | First Stage of Kneading | Emulsion-Polymerized SBR-C *13 | 68.75 | 68.75 | 68.75 | 68.75 | 68.75 | 68.75 | 68.75 |
| | | Solution-Polymerized SBR-D *14 | 68.75 | 68.75 | 68.75 | 68.75 | 68.75 | 68.75 | 68.75 |
| | | Carbon Black N220 *2 | 10 | 10 | 10 | 10 | 10 | 10 | 10 |
| | | Silica *3 | 80 | 80 | 80 | 80 | 80 | 80 | 80 |

TABLE 5-continued

|  |  | part by mass | Example |  |  | Comparative Example |  |  |  |
|---|---|---|---|---|---|---|---|---|---|
|  |  |  | 22 | 30 | 31 | 15 | 19 | 20 | 21 |
|  |  | Silane Coupling Agent Si75 *4 | 6.5 | 6.5 | 6.5 | 6.5 | 6.5 | 6.5 | 6.5 |
|  |  | Aromatic Oil | 5.0 | 5.0 | 5.0 | 5.0 | 5.0 | 5.0 | 5.0 |
|  |  | Stearic Acid | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 |
|  | according to | 1,3-Diphenylguanidine *6 | 1.0 | — | — | — | — | — | — |
|  | kneading method A | 1,3-Di-o-tolylguanidine *19 | — | 1.0 | — | — | — | — | — |
|  |  | 1-o-tolyl biguanide *20 | — | — | 1.0 | — | — | — | — |
|  | according to | 1,3-Diphenylguanidine *6 | — | — | — | — | 1.0 | — | — |
|  | kneading method B | 1,3-Di-o-tolylguanidine *19 | — | — | — | — | — | 1.0 | — |
|  |  | 1-o-tolyl biguanide *20 | — | — | — | — | — | — | 1.0 |
| Final Stage | Stearic Acid |  | — | — | — | — | — | — | — |
| of Kneading | Antiaging Agent 6PPD *5 |  | — | — | — | — | — | — | — |
|  | Zinc Flower |  | 3.0 | 3.0 | 3.0 | 3.0 | 3.0 | 3.0 | 3.0 |
|  | 1,3-Diphenylguanidine *6 |  | 1.0 | 1.0 | 1.0 | 1.0 | 1.0 | 1.0 | 1.0 |
|  | Vulcanization Promoter MBTS *8 |  | 0.8 | 0.8 | 0.8 | 0.8 | 0.8 | 0.8 | 0.8 |
|  | Vulcanization Promoter TBBS *918 |  | 1.5 | 1.5 | 1.5 | 1.5 | 1.5 | 1.5 | 1.5 |
|  | Sulfur |  | 1.5 | 1.5 | 1.5 | 1.5 | 1.5 | 1.5 | 1.5 |
| Time (sec) until addition of guanidines after addition of silica and silane coupling agent |  |  | 90 | 90 | 90 | — | 0 | 0 | 0 |
| Temperature (° C.) of rubber composition at addition of guanidines |  |  | 130 | 130 | 130 | — | 65 | 65 | 65 |
| Vulcanizate Physical Property | Low-Heat-Generation Property (tanδ index) |  | 130 | 128 | 124 | 100 | 103 | 104 | 102 |

[Notes]
*2 to *8 are all the same as in Table 1, and *13, *14 and *18 are the same as in Table 4.
*19: Ouchi Shinko Chemical's trade name "Nocceler DT"
*20: Ouchi Shinko Chemical's trade name "Nocceler BG"

Examples 32 to 195, and Comparative Examples 22 to 68

According to the compositional formulation and the kneading method shown in Table 6 to Table 32 and in the same manner as in Examples 1 to 31 and Comparative Examples 1 to 21, the ingredients were kneaded in a Banbury mixer in such a controlled manner that, after addition of the rubber component, silica, the silane coupling agent and others in the first stage of kneading, the time (second) before addition of the vulcanization promoter (D) and the temperature (° C.) of the rubber composition at addition of the vulcanization promoter (D) could be as in Table 6 to Table 32, or in the first stage of kneading, the vulcanization promoter (D) was not added and the ingredients were kneaded in the Banbury mixer, thereby preparing 211 types of rubber compositions. The obtained, 211 rubber compositions were evaluated in point of the low-heat-generation property (tan δ index) thereof according to the above-mentioned method. For comparison, the data of some Examples and some Comparative Examples are again shown here. The results are shown in Table 6 to Table 32.

TABLE 6

|  |  | part by mass | Example |  |  |  |  |  | Comparative Example |  |  |  |  |  |
|---|---|---|---|---|---|---|---|---|---|---|---|---|---|---|
|  |  |  | 32 | 33 | 34 | 35 | 36 | 37 | 1 | 2 | 3 | 22 | 23 | 6 |
| Formulation | First Stage | Emulsion-Polymerized SBR-A *1 | 100 | 100 | 100 | 100 | 100 | 100 | 100 | 100 | 100 | 100 | 100 | 100 |
|  | of Kneading | Carbon Black N220 *2 | 10 | 10 | 10 | — | 10 | 10 | 10 | 10 | 10 | 10 | 10 | — |
|  |  | Silica *3 | 50 | 50 | 50 | 60 | 50 | 50 | 50 | 50 | 50 | 50 | 50 | 60 |
|  |  | Silane Coupling Agent Si75 *4 | 4.0 | 4.0 | 4.0 | 4.8 | 4.0 | 4.0 | 4.0 | — | 4.0 | 4.0 | 4.0 | 4.8 |
|  |  | Aromatic Oil | 30 | 30 | 30 | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | — | — | 2.0 | 2.0 |
|  |  | Antiaging Agent 6PPD *5 | 1.0 | 1.0 | 1.0 | 1.0 | 1.0 | 1.0 | 1.0 | 1.0 | — | — | 1.0 | 1.0 |
|  |  | N-cyclohexyl-2-benzothiazolylsulfenamide *18 according to kneading method A | 1.0 | 0.3 | 1.5 | 1.0 | 0.1 | 2.5 | — | — | — | — | — | — |
|  |  | N-cyclohexyl-2-benzothiazolylsulfenamide *18 according to kneading method B | — | — | — | — | — | — | — | — | — | 1.0 | 1.0 | — |
|  | Final Stage | Stearic Acid | — | — | — | — | — | — | — | — | 2.0 | 2.0 | — | — |
|  | of Kneading | Antiaging Agent 6PPD *5 | — | — | — | — | — | — | — | — | 1.0 | 1.0 | — | — |
|  |  | Antiaging Agent TMDQ *7 | 1.0 | 1.0 | 1.0 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 | 1.5 | 1.5 | 1.5 |
| Time (sec) until addition of N-cyclohexyl-2-benzothiazolylsulfenamide after addition of silica and silane coupling agent |  |  | 90 | 90 | 90 | 90 | 90 | 90 | — | — | — | 0 | 0 | — |
| Temperature (° C.) of rubber composition at addition of N-cyclohexyl-2-benzothiazolylsulfenamide |  |  | 130 | 130 | 130 | 130 | 130 | 130 | — | — | — | 70 | 70 | — |

TABLE 6-continued

|  |  | Example |  |  |  |  |  | Comparative Example |  |  |  |  |  |
|---|---|---|---|---|---|---|---|---|---|---|---|---|---|
| part by mass |  | 32 | 33 | 34 | 35 | 36 | 37 | 1 | 2 | 3 | 22 | 23 | 6 |
| Vulcanizate Physical Property | Low-Heat-Generation Property (tanδ index) | 130 | 127 | 131 | 135 | 117 | 129 | 100 | 101 | 104 | 105 | 104 | 102 |

[Notes]
*1 to *18 are all the same as in Table 1 to Table 5.

TABLE 7

|  |  |  | Example |  |  |  |  |  |  |  |  | Comparative Example |  |
|---|---|---|---|---|---|---|---|---|---|---|---|---|---|
|  |  | part by mass | 32 | 38 | 39 | 40 | 41 | 42 | 43 | 44 | 45 | 1 | 7 |
| Formulation | First Stage of Kneading | Emulsion-Polymerized SBR-A *1 | 100 | 100 | 100 | 100 | 100 | 100 | 100 | — | — | 100 | — |
|  |  | Solution-Polymerized SBR-B *10 | — | — | — | — | — | — | — | 100 | 100 | — | 100 |
|  |  | Carbon Black N220 *2 | 10 | 10 | 10 | 10 | 10 | 10 | 10 | 10 | 10 | 10 | 10 |
|  |  | Silica *3 | 50 | 50 | 50 | 50 | 50 | 50 | 50 | 50 | 50 | 50 | 50 |
|  |  | Silane Coupling Agent Si75 *4 | 4.0 | 4.0 | 4.0 | 4.0 | 4.0 | 4.0 | 4.0 | 4.0 | 4.0 | 4.0 | 4.0 |
|  |  | Aromatic Oil | 30 | 30 | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 | 1.0 | 1.0 | 1.0 |
|  |  | N-cyclohexyl-2-benzothiazolylsulfenamide *18 according to kneading method A | 1.0 | 1.0 | 1.0 | 1.0 | 1.0 | 1.0 | 1.0 | 1.0 | 1.0 | — | — |
|  |  | N-cyclohexyl-2-benzothiazolylsulfenamide *18 according to kneading method B | — | — | — | — | — | — | — | — | — | — | — |
|  | Final Stage of Kneading | Stearic Acid | — | — | — | — | — | — | — | — | — | — | — |
|  |  | Antiaging Agent 6PPD *5 | — | — | — | — | — | — | — | — | — | — | — |
|  |  | Antiaging Agent TMDQ *7 | 1.0 | 1.0 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 | 1.5 | 1.5 |
| Time (sec) until addition of N-cyclohexyl-2-benzothiazolylsulfenamide after addition of silica and silane coupling agent |  |  | 90 | 90 | 60 | 30 | 60 | 120 | 120 | 90 | 60 | — | — |
| Temperature (° C.) of rubber composition at addition of N-cyclohexyl-2-benzothiazolylsulfenamide |  |  | 130 | 145 | 120 | 95 | 130 | 130 | 145 | 130 | 120 | — | — |
| Vulcanizate Physical Property | Low-Heat-Generation Property (tanδ index) |  | 130 | 133 | 124 | 121 | 127 | 129 | 135 | 131 | 127 | 100 | 102 |

[Notes]
*1 to *18 are all the same as in Table 1 to Table 5.

TABLE 8

|  |  |  | Example |  |  |  |  |  |
|---|---|---|---|---|---|---|---|---|
|  |  | part by mass | 46 | 47 | 48 | 49 | 50 | 51 |
| Formulation | First Stage of Kneading | Emulsion-Polymerized SBR-C *13 | 68.75 | 68.75 | 68.75 | 68.75 | 68.75 | 68.75 |
|  |  | Solution-Polymerized SBR-D *14 | 68.75 | 68.75 | 68.75 | 68.75 | 68.75 | 68.75 |
|  |  | Carbon Black N220 *2 | 10 | 10 | 10 | 10 | 10 | 10 |
|  |  | Silica *3 | 80 | 80 | 80 | 80 | 80 | 80 |
|  |  | Silane Coupling Agent Si75 *4 | 6.5 | — | — | — | 6.5 | — |
|  |  | Silane Coupling Agent NXT *15 | — | 6.5 | — | — | — | 6.5 |
|  |  | Silane Coupling Agent NXT-Z *16 | — | — | 6.5 | — | — | — |
|  |  | Silane Coupling Agent *17 | — | — | — | 6.5 | — | — |
|  |  | Aromatic Oil | 5.0 | 5.0 | 5.0 | 5.0 | 5.0 | 5.0 |
|  |  | Stearic Acid | 2.0 | 2.0 | 2.0 | 2.0 | — | — |
|  |  | Antiaging Agent 6PPD *5 | 1.0 | 1.0 | 1.0 | 1.0 | — | — |
|  |  | N-cyclohexyl-2-benzothiazolylsulfenamide *18 according to kneading method A | 1.0 | 1.0 | 1.0 | 1.0 | 1.0 | 1.0 |
|  |  | N-cyclohexyl-2-benzothiazolylsulfenamide *18 according to kneading method B | — | — | — | — | — | — |

TABLE 8-continued

|  |  |  |  |  |  |  | 2.0 | 2.0 |
|---|---|---|---|---|---|---|---|---|
| Final Stage of Kneading | Stearic Acid | — | — | — | — | 2.0 | 2.0 |
|  | Antiaging Agent 6PPD *5 | — | — | — | — | 1.0 | 1.0 |
|  | Zinc Flower | 3.0 | 3.0 | 3.0 | 3.0 | 3.0 | 3.0 |
|  | 1,3-Diphenylguanidine *6 | 1.0 | 1.0 | 1.0 | 1.0 | 1.0 | 1.0 |
|  | Vulcanization Promoter MBTS *8 | 0.8 | 0.8 | 0.8 | 0.8 | 0.8 | 0.8 |
|  | Vulcanization Promoter CBS *18 | 1.5 | 1.5 | 1.5 | 1.5 | 1.5 | 1.5 |
|  | Sulfur | 1.5 | 1.5 | 1.5 | 1.5 | 1.5 | 1.5 |
| Time (sec) until addition of N-cyclohexyl-2-benzothiazolylsulfenamide after addition of silica and silane coupling agent | | 90 | 90 | 90 | 90 | 90 | 90 |
| Temperature (° C.) of rubber composition at addition of N-cyclohexyl-2-benzothiazolylsulfenamide | | 130 | 130 | 130 | 130 | 130 | 130 |
| Vulcanizate Physical Property | Low-Heat-Generation Property (tan δ index) | 124 | 125 | 120 | 134 | 130 | 128 |

|  |  |  | Example | | Comparative Example | | | |
|---|---|---|---|---|---|---|---|---|
|  | part by mass | | 52 | 53 | 15 | 16 | 17 | 18 |
| Formulation | First Stage of Kneading | Emulsion-Polymerized SBR-C *13 | 68.75 | 68.75 | 68.75 | 68.75 | 68.75 | 68.75 |
|  |  | Solution-Polymerized SBR-D *14 | 68.75 | 68.75 | 68.75 | 68.75 | 68.75 | 68.75 |
|  |  | Carbon Black N220 *2 | 10 | 10 | 10 | 10 | 10 | 10 |
|  |  | Silica *3 | 80 | 80 | 80 | 80 | 80 | 80 |
|  |  | Silane Coupling Agent Si75 *4 | — | — | 6.5 | — | — | — |
|  |  | Silane Coupling Agent NXT *15 | — | — | — | 6.5 | — | — |
|  |  | Silane Coupling Agent NXT-Z *16 | 6.5 | — | — | — | 6.5 | — |
|  |  | Silane Coupling Agent *17 | — | 6.5 | — | — | — | 6.5 |
|  |  | Aromatic Oil | 5.0 | 5.0 | 5.0 | 5.0 | 5.0 | 5.0 |
|  |  | Stearic Acid | — | — | 2.0 | 2.0 | 2.0 | 2.0 |
|  |  | Antiaging Agent 6PPD *5 | — | — | 1.0 | 1.0 | 1.0 | 1.0 |
|  |  | N-cyclohexyl-2-benzothiazolylsulfenamide *18 according to kneading method A | 1.0 | 1.0 | — | — | — | — |
|  |  | N-cyclohexyl-2-benzothiazolylsulfenamide *18 according to kneading method B | — | — | — | — | — | — |
|  | Final Stage of Kneading | Stearic Acid | 2.0 | 2.0 | — | — | — | — |
|  |  | Antiaging Agent 6PPD *5 | 1.0 | 1.0 | — | — | — | — |
|  |  | Zinc Flower | 3.0 | 3.0 | 3.0 | 3.0 | 3.0 | 3.0 |
|  |  | 1,3-Diphenylguanidine *6 | 1.0 | 1.0 | 1.0 | 1.0 | 1.0 | 1.0 |
|  |  | Vulcanization Promoter MBTS *8 | 0.8 | 0.8 | 0.8 | 0.8 | 0.8 | 0.8 |
|  |  | Vulcanization Promoter CBS *18 | 1.5 | 1.5 | 1.5 | 1.5 | 1.5 | 1.5 |
|  |  | Sulfur | 1.5 | 1.5 | 1.5 | 1.5 | 1.5 | 1.5 |
| Time (sec) until addition of N-cyclohexyl-2-benzothiazolylsulfenamide after addition of silica and silane coupling agent | | | 90 | 90 | — | — | — | — |
| Temperature (° C.) of rubber composition at addition of N-cyclohexyl-2-benzothiazolylsulfenamide | | | 130 | 130 | — | — | — | — |
| Vulcanizate Physical Property | Low-Heat-Generation Property (tan δ index) | | 124 | 139 | 100 | 115 | 110 | 112 |

[Notes]
*1 to *18 are all the same as in Table 1 to Table 5.

TABLE 9

|  |  |  |  | Example | | Comparative Example | | |
|---|---|---|---|---|---|---|---|---|
|  | part by mass | | | 46 | 54 | 15 | 24 | 25 |
| Formulation | First Stage of Kneading | Emulsion-Polymerized SBR-C *13 | | 68.75 | 68.75 | 68.75 | 68.75 | 68.75 |
|  |  | Solution-Polymerized SBR-D *14 | | 68.75 | 68.75 | 68.75 | 68.75 | 68.75 |
|  |  | Carbon Black N220 *2 | | 10 | 10 | 10 | 10 | 10 |
|  |  | Silica *3 | | 80 | 80 | 80 | 80 | 80 |
|  |  | Silane Coupling Agent Si75 *4 | | 6.5 | 6.5 | 6.5 | 6.5 | 6.5 |
|  |  | Aromatic Oil | | 5.0 | 5.0 | 5.0 | 5.0 | 5.0 |
|  |  | Stearic Acid | | 2.0 | 2.0 | 2.0 | 2.0 | 2.0 |
|  |  | Antiaging Agent 6PPD *5 | | 1.0 | 1.0 | 1.0 | 1.0 | 1.0 |
|  |  | according to kneading method A | N-cyclohexyl-2-benzothiazolylsulfenamide *18 | 1.0 | — | — | — | — |
|  |  |  | N-tert-butyl-2-benzothiazolylsulfenamide *9 | — | 1.0 | — | — | — |
|  |  | according to kneading method B | N-cyclohexyl-2-benzothiazolylsulfenamide *18 | — | — | — | 1.0 | — |
|  |  |  | N-tert-butyl-2-benzothiazolylsulfenamide *9 | — | — | — | — | 1.0 |

TABLE 9-continued

|  |  | part by mass | Example 46 | Example 54 | Comparative Example 15 | Comparative Example 24 | Comparative Example 25 |
|---|---|---|---|---|---|---|---|
| Final Stage of Kneading | | Stearic Acid | — | — | — | — | — |
| | | Antiaging Agent 6PPD *5 | — | — | — | — | — |
| | | Zinc Flower | 3.0 | 3.0 | 3.0 | 3.0 | 3.0 |
| | | 1,3-Diphenylguanidine *6 | 1.0 | 1.0 | 1.0 | 1.0 | 1.0 |
| | | Vulcanization Promoter MBTS *8 | 0.8 | 0.8 | 0.8 | 0.8 | 0.8 |
| | | Vulcanization Promoter CBS *18 | 1.5 | 1.5 | 1.5 | 1.5 | 1.5 |
| | | Sulfur | .5 | 1.5 | 1.5 | 1.5 | 1.5 |
| Time (sec) until addition of sulfenamides after addition of silica and silane coupling agent | | | 90 | 90 | — | 0 | 0 |
| Temperature (° C.) of rubber composition at addition of sulfenamides | | | 130 | 130 | — | 65 | 65 |
| Vulcanizate Physical Property | | Low-Heat-Generation Property (tanδ index) | 124 | 123 | 100 | 103 | 104 |

[Notes]
*1 to *18 are all the same as in Table 1 to Table 5.

TABLE 10

|  |  |  | Example 55 | Example 56 | Example 57 | Example 58 | Example 59 | Example 60 | Comparative Example 1 | Comparative Example 2 | Comparative Example 3 | Comparative Example 26 | Comparative Example 27 | Comparative Example 6 |
|---|---|---|---|---|---|---|---|---|---|---|---|---|---|---|
| Formulation | First Stage of Kneading | Emulsion-Polymerized SBR-A *1 | 100 | 100 | 100 | 100 | 100 | 100 | 100 | 100 | 100 | 100 | 100 | 100 |
| | | Carbon Black N220 *2 | 10 | 10 | 10 | — | 10 | 10 | 10 | 10 | 10 | 10 | 10 | — |
| | | Silica *3 | 50 | 50 | 50 | 60 | 50 | 50 | 50 | 50 | 50 | 50 | 50 | 60 |
| | | Silane Coupling Agent Si75 *4 | 4.0 | 4.0 | 4.0 | 4.8 | 4.0 | 4.0 | 4.0 | — | 4.0 | 4.0 | 4.0 | 4.8 |
| | | Aromatic Oil | 30 | 30 | 30 | 30 | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 | — | — | 2.0 | 2.0 |
| | | Antiaging Agent 6PPD *5 | 1.0 | 1.0 | 1.0 | 1.0 | 1.0 | 1.0 | 1.0 | 1.0 | — | — | 1.0 | 1.0 |
| | | 2-Mercaptobenzothiazole *21 according to kneading method A | 0.6 | 0.3 | 1.1 | 0.6 | 0.1 | 2.0 | — | — | — | — | — | — |
| | | 2-Mercaptobenzothiazole *21 according to kneading method B | — | — | — | — | — | — | — | — | — | 0.6 | 0.6 | — |
| | Final Stage of Kneading | Stearic Acid | — | — | — | — | — | — | — | — | 2.0 | 2.0 | — | — |
| | | Antiaging Agent 6PPD *5 | — | — | — | — | — | — | — | — | 1.0 | 1.0 | — | — |
| | | Antiaging Agent TMDQ *7 | 1.0 | 1.0 | 1.0 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 |
| Time (sec) until addition of 2-mercaptobenzothiazole after addition of silica and silane coupling agent | | | 90 | 90 | 90 | 90 | 90 | 90 | — | — | — | 0 | 0 | — |
| Temperature (° C.) of rubber composition at addition of 2-mercaptobenzothiazole | | | 130 | 130 | 130 | 130 | 130 | 130 | — | — | — | 70 | 70 | — |
| Vulcanizate Physical Property | | Low-Heat-Generation Property (tanδ index) | 126 | 125 | 125 | 131 | 124 | 126 | 100 | 101 | 104 | 105 | 104 | 102 |

[Notes]
*1 to *9 are all the same as in Table 1 to Table 5.
*21: Ouchi Shinko Chemical's trade name "Nocceler M-P"

TABLE 11

|  |  |  | Example 55 | Example 61 | Example 62 | Example 63 | Example 64 | Example 65 | Example 66 | Example 67 | Example 68 | Comparative Example 1 | Comparative Example 7 |
|---|---|---|---|---|---|---|---|---|---|---|---|---|---|
| Formulation | First Stage of Kneading | Emulsion-Polymerized SBR-A *1 | 100 | 100 | 100 | 100 | 100 | 100 | 100 | — | — | 100 | — |
| | | Solution-Polymerized SBR-B *10 | — | — | — | — | — | — | — | 100 | 100 | — | 100 |
| | | Carbon Black N220 *2 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 | 2.0 | 2.0 | 2.0 |
| | | Antiaging Agent 6PPD *5 | 1.0 | 1.0 | 1.0 | 1.0 | 1.0 | 1.0 | 1.0 | 1.0 | 1.0 | 1.0 | 1.0 |
| | | 2-Mercaptobenzothiazole *21 according to kneading method A | 0.6 | 0.6 | 0.6 | 0.6 | 0.6 | 0.6 | 0.6 | 0.6 | 0.6 | — | — |
| | | 2-Mercaptobenzothiazole *21 according to kneading method B | — | — | — | — | — | — | — | — | — | — | — |

TABLE 11-continued

|  |  | part by mass | Example |  |  |  |  |  |  |  |  | Comparative Example |  |
|---|---|---|---|---|---|---|---|---|---|---|---|---|---|
|  |  |  | 55 | 61 | 62 | 63 | 64 | 65 | 66 | 67 | 68 | 1 | 7 |
|  | Final Stage of Kneading | Stearic Acid | — | — | — | — | — | — | — | — | — | — | — |
|  |  | Antiaging Agent 6PPD *5 | — | — | — | — | — | — | — | — | — | — | — |
|  |  | Antiaging Agent TMDQ *7 | 1.0 | 1.0 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 | 1.5 | 1.5 |
| Time (sec) until addition of 2-mercaptobenzothiazole after addition of silica and silane coupling agent |  |  | 90 | 90 | 60 | 30 | 60 | 120 | 120 | 90 | 60 | — | — |
| Temperature (° C.) of rubber composition at addition of 2-mercaptobenzothiazole |  |  | 130 | 145 | 120 | 95 | 130 | 130 | 145 | 130 | 120 | — | — |
| Vulcanizate Physical Property | Low-Heat-Generation Property (tanδ index) |  | 126 | 128 | 124 | 121 | 125 | 127 | 130 | 127 | 125 | 100 | 102 |

[Notes]
*1 to *9 are all the same as in Table 1 to Table 5, and *21 is the same as in Table 10.

TABLE 12

|  |  | part by mass | Example |  |  |  |  |  |
|---|---|---|---|---|---|---|---|---|
|  |  |  | 69 | 70 | 71 | 72 | 73 | 74 |
| Formulation | First Stage of Kneading | Emulsion-Polymerized SBR-C *13 | 68.75 | 68.75 | 68.75 | 68.75 | 68.75 | 68.75 |
|  |  | Solution-Polymerized SBR-D *14 | 68.75 | 68.75 | 68.75 | 68.75 | 68.75 | 68.75 |
|  |  | Carbon Black N220 *2 | 10 | 10 | 10 | 10 | 10 | 10 |
|  |  | Silica *3 | 80 | 80 | 80 | 80 | 80 | 80 |
|  |  | Silane Coupling Agent Si75 *4 | 6.5 | — | — | — | 6.5 | — |
|  |  | Silane Coupling Agent NXT *15 | — | 6.5 | — | — | — | 6.5 |
|  |  | Silane Coupling Agent NXT-Z *16 | — | — | 6.5 | — | — | — |
|  |  | Silane Coupling Agent *17 | — | — | — | 6.5 | — | — |
|  |  | Aromatic Oil | 5.0 | 5.0 | 5.0 | 5.0 | 5.0 | 5.0 |
|  |  | Stearic Acid | 2.0 | 2.0 | 2.0 | 2.0 | — | — |
|  |  | Antiaging Agent 6PPD *5 | 1.0 | 1.0 | 1.0 | 1.0 | — | — |
|  |  | 2-Mercaptobenzothiazole *21 according to kneading method A | 0.6 | 0.6 | 0.6 | 0.6 | 0.6 | 0.6 |
|  |  | 2-Mercaptobenzothiazole *21 according to kneading method B | — | — | — | — | — | — |
|  | Final Stage of Kneading | Stearic Acid | — | — | — | — | 2.0 | 2.0 |
|  |  | Antiaging Agent 6PPD *5 | — | — | — | — | 1.0 | 1.0 |
|  |  | Zinc Flower | 3.0 | 3.0 | 3.0 | 3.0 | 3.0 | 3.0 |
|  |  | 1,3-Diphenylguanidine *6 | 1.0 | 1.0 | 1.0 | 1.0 | 1.0 | 1.0 |
|  |  | Vulcanization Promoter MBTS *8 | 0.8 | 0.8 | 0.8 | 0.8 | 0.8 | 0.8 |
|  |  | Vulcanization Promoter CBS *18 | 1.5 | 1.5 | 1.5 | 1.5 | 1.5 | 1.5 |
|  |  | Sulfur | 1.5 | 1.5 | 1.5 | 1.5 | 1.5 | 1.5 |
| Time (sec) until addition of 2-mercaptobenzothiazole after addition of silica and silane coupling agent |  |  | 90 | 90 | 90 | 90 | 90 | 90 |
| Temperature (° C.) of rubber composition at addition of 2-mercaptobenzothiazole |  |  | 130 | 130 | 130 | 130 | 130 | 130 |
| Vulcanizate Physical Property | Low-Heat-Generation Property (tanδ index) |  | 125 | 127 | 124 | 138 | 126 | 127 |

|  |  | part by mass | Example |  | Comparative Example |  |  |  |
|---|---|---|---|---|---|---|---|---|
|  |  |  | 75 | 76 | 15 | 16 | 17 | 18 |
| Formulation | First Stage of Kneading | Emulsion-Polymerized SBR-C *13 | 68.75 | 68.75 | 68.75 | 68.75 | 68.75 | 68.75 |
|  |  | Solution-Polymerized SBR-D *14 | 68.75 | 68.75 | 68.75 | 68.75 | 68.75 | 68.75 |
|  |  | Carbon Black N220 *2 | 10 | 10 | 10 | 10 | 10 | 10 |
|  |  | Silica *3 | 80 | 80 | 80 | 80 | 80 | 80 |
|  |  | Silane Coupling Agent Si75 *4 | — | — | 6.5 | — | — | — |
|  |  | Silane Coupling Agent NXT *15 | — | — | — | 6.5 | — | — |
|  |  | Silane Coupling Agent NXT-Z *16 | 6.5 | — | — | — | 6.5 | — |
|  |  | Silane Coupling Agent *17 | — | 6.5 | — | — | — | 6.5 |
|  |  | Aromatic Oil | 5.0 | 5.0 | 5.0 | 5.0 | 5.0 | 5.0 |
|  |  | Stearic Acid | — | — | 2.0 | 2.0 | 2.0 | 2.0 |
|  |  | Antiaging Agent 6PPD *5 | — | — | 1.0 | 1.0 | 1.0 | 1.0 |
|  |  | 2-Mercaptobenzothiazole *21 according to kneading method A | 0.6 | 0.6 | — | — | — | — |
|  |  | 2-Mercaptobenzothiazole *21 according to kneading method B | — | — | — | — | — | — |

TABLE 12-continued

| | | | | | | | | |
|---|---|---|---|---|---|---|---|---|
| | Final Stage of Kneading | Stearic Acid | 2.0 | 2.0 | — | — | — | — |
| | | Antiaging Agent 6PPD *5 | 1.0 | 1.0 | — | — | — | — |
| | | Zinc Flower | 3.0 | 3.0 | 3.0 | 3.0 | 3.0 | 3.0 |
| | | 1,3-Diphenylguanidine *6 | 1.0 | 1.0 | 1.0 | 1.0 | 1.0 | 1.0 |
| | | Vulcanization Promoter MBTS *8 | 0.8 | 0.8 | 0.8 | 0.8 | 0.8 | 0.8 |
| | | Vulcanization Promoter CBS *18 | 1.5 | 1.5 | 1.5 | 1.5 | 1.5 | 1.5 |
| | | Sulfur | 1.5 | 1.5 | 1.5 | 1.5 | 1.5 | 1.5 |
| Time (sec) until addition of 2-mercaptobenzothiazole after addition of silica and silane coupling agent | | | 90 | 90 | — | — | — | — |
| Temperature (° C.) of rubber composition at addition of 2-mercaptobenzothiazole | | | 130 | 130 | — | — | — | — |
| Vulcanizate Physical Property | | Low-Heat-Generation Property (tanδ index) | 125 | 139 | 100 | 115 | 110 | 112 |

[Notes]
*1 to *18 are all the same as in Table 1 to Table 5, and *21 is the same as in Table 10.

TABLE 13

| | | | Example | | Comparative Example | | |
|---|---|---|---|---|---|---|---|
| | | part by mass | 69 | 77 | 15 | 28 | 29 |
| Formulation | First Stage of Kneading | Emulsion-Polymerized SBR-C *13 | 68.75 | 68.75 | 68.75 | 68.75 | 68.75 |
| | | Solution-Polymerized SBR-D *14 | 68.75 | 68.75 | 68.75 | 68.75 | 68.75 |
| | | Carbon Black N220 *2 | 10 | 10 | 10 | 10 | 10 |
| | | Silica *3 | 80 | 80 | 80 | 80 | 80 |
| | | Silane Coupling Agent Si75 *4 | 6.5 | 6.5 | 6.5 | 6.5 | 6.5 |
| | | Aromatic Oil | 5.0 | 5.0 | 5.0 | 5.0 | 5.0 |
| | | Stearic Acid | 2.0 | 2.0 | 2.0 | 2.0 | 2.0 |
| | | Antiaging Agent 6PPD *5 | 1.0 | 1.0 | 1.0 | 1.0 | 1.0 |
| | | according to kneading method A   2-Mercaptobenzothiazole *21 | 0.6 | — | — | — | — |
| | | Di-2-benzothiazolyl Disulfide *8 | — | 1.0 | — | — | — |
| | | according to kneading method B   2-Mercaptobenzothiazole *21 | — | — | — | 0.6 | — |
| | | Di-2-benzothiazolyl Disulfide *8 | — | — | — | — | 1.0 |
| | Final Stage of Kneading | Stearic Acid | — | — | — | — | — |
| | | Antiaging Agent 6PPD *5 | — | — | — | — | — |
| | | Zinc Flower | 3.0 | 3.0 | 3.0 | 3.0 | 3.0 |
| | | 1,3-Diphenylguanidine *6 | 1.0 | 1.0 | 1.0 | 1.0 | 1.0 |
| | | Vulcanization Promoter MBTS *8 | 0.8 | 0.8 | 0.8 | 0.8 | 0.8 |
| | | Vulcanization Promoter CBS *18 | 1.5 | 1.5 | 1.5 | 1.5 | 1.5 |
| | | Sulfur | 1.5 | 1.5 | 1.5 | 1.5 | 1.5 |
| Time (sec) until addition of thiazoles after addition of silica and silane coupling agent | | | 90 | 90 | — | 0 | 0 |
| Temperature (° C.) of rubber composition at addition of thiazoles | | | 130 | 130 | — | 65 | 65 |
| Vulcanizate Physical Property | | Low-Heat-Generation Property (tanδ index) | 125 | 122 | 100 | 105 | 103 |

[Notes]
*1 to *18 are all the same as in Table 1 to Table 5, and *21 is the same as in Table 10.

TABLE 14

| | | | Example | | | | | | Comparative Example | | | | | |
|---|---|---|---|---|---|---|---|---|---|---|---|---|---|---|
| | | part by mass | 78 | 79 | 80 | 81 | 82 | 83 | 1 | 2 | 3 | 30 | 31 | 6 |
| Formulation | First Stage of Kneading | Emulsion-Polymerized SBR-A *1 | 100 | 100 | 100 | 100 | 100 | 100 | 100 | 100 | 100 | 100 | 100 | 100 |
| | | Carbon Black N220 *2 | 10 | 10 | 10 | — | 10 | 10 | 10 | 10 | 10 | 10 | 10 | — |
| | | Silica *3 | 50 | 50 | 50 | 60 | 50 | 50 | 50 | 50 | 50 | 50 | 50 | 60 |
| | | Silane Coupling Agent Si75 *4 | 4.0 | 4.0 | 4.0 | 4.8 | 4.0 | 4.0 | 4.0 | — | 4.0 | 4.0 | 4.0 | 4.8 |
| | | Aromatic Oil | 30 | 30 | 30 | 30 | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 | — | — | 2.0 | 2.0 |
| | | Antiaging Agent 6PPD *5 | 1.0 | 1.0 | 1.0 | 1.0 | 1.0 | 1.0 | 1.0 | 1.0 | — | — | 1.0 | 1.0 |
| | | Tetrakis(2-ethylhexyl)thiuram Disulfide *22 according to kneading method A | 1.0 | 0.5 | 2.0 | 1.0 | 0.1 | 3.0 | — | — | — | — | — | — |
| | | Tetrakis(2-ethylhexyl)thiuram Disulfide *22 according to kneading method B | — | — | — | — | — | — | — | — | — | 1.0 | 1.0 | — |
| | Final Stage of Kneading | Stearic Acid | — | — | — | — | — | — | — | — | 2.0 | 2.0 | — | — |
| | | Antiaging Agent 6PPD *5 | — | — | — | — | — | — | — | — | 1.0 | 1.0 | — | — |
| | | Antiaging Agent TMDQ *7 | 1.0 | 1.0 | 1.0 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 |

TABLE 14-continued

| part by mass | Example | | | | | | Comparative Example | | | | | |
|---|---|---|---|---|---|---|---|---|---|---|---|---|
| | 78 | 79 | 80 | 81 | 82 | 83 | 1 | 2 | 3 | 30 | 31 | 6 |
| Time (sec) until addition of tetrakis(2-ethylhexyl)thiuram disulfide after addition of silica and silane coupling agent | 90 | 90 | 90 | 90 | 90 | 90 | — | — | — | 0 | 0 | — |
| Temperature (° C.) of rubber composition at addition of tetrakis(2-ethylhexyl)thiuram disulfide | 130 | 130 | 130 | 130 | 130 | 130 | — | — | — | 70 | 70 | — |
| Vulcanizate Physical Property — Low-Heat-Generation Property (tanδ index) | 128 | 127 | 129 | 142 | 124 | 130 | 100 | 101 | 104 | 105 | 104 | 102 |

[Notes]
*1 to *9 are all the same as in Table 1 to Table 5.
*22: Ouchi Shinko Chemical's trade name "Nocceler TOT-N"

TABLE 15

| | | part by mass | Example | | | | | | | | | Comparative Example | |
|---|---|---|---|---|---|---|---|---|---|---|---|---|---|
| | | | 78 | 84 | 85 | 86 | 87 | 88 | 89 | 90 | 91 | 1 | 7 |
| Formulation | First Stage of Kneading | Emulsion-Polymerized SBR-A *1 | 100 | 100 | 100 | 100 | 100 | 100 | 100 | — | — | 100 | — |
| | | Solution-Polymerized SBR-B *10 | — | — | — | — | — | — | — | 100 | 100 | — | 100 |
| | | Carbon Black N220 *2 | 10 | 10 | 10 | 10 | 10 | 10 | 10 | 10 | 10 | 10 | 10 |
| | | Silica *3 | 50 | 50 | 50 | 50 | 50 | 50 | 50 | 50 | 50 | 50 | 50 |
| | | Silane Coupling Agent Si75 *4 | 4.0 | 4.0 | 4.0 | 4.0 | 4.0 | 4.0 | 4.0 | 4.0 | 4.0 | 4.0 | 4.0 |
| | | Aromatic Oil | 30 | 30 | 30 | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 | 2.0 | 2.0 | 2.0 |
| | | Antiaging Agent 6PPD *5 | 1.0 | 1.0 | 1.0 | 1.0 | 1.0 | 1.0 | 1.0 | 1.0 | 1.0 | 1.0 | 1.0 |
| | | Tetrakis(2-ethylhexyl)thiuram disulfide *22 according to kneading method A | 1.0 | 1.0 | 1.0 | 1.0 | 1.0 | 1.0 | 1.0 | 1.0 | 1.0 | — | — |
| | | Tetrakis(2-ethylhexyl)thiuram disulfide *22 according to kneading method B | — | — | — | — | — | — | — | — | — | — | — |
| | Final Stage of Kneading | Stearic Acid | — | — | — | — | — | — | — | — | — | — | — |
| | | Antiaging Agent 6PPD *5 | — | — | — | — | — | — | — | — | — | — | — |
| | | Antiaging Agent TMDQ *7 | 1.0 | 1.0 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 |
| Time (sec) until addition of tetrakis(2-ethylhexyl)thiuram disulfide after addition of silica and silane coupling agent | | | 90 | 90 | 60 | 30 | 60 | 120 | 120 | 90 | 60 | — | — |
| Temperature (° C.) of rubber composition at addition of tetrakis(2-ethylhexyl)thiuram disulfide | | | 130 | 145 | 120 | 95 | 130 | 130 | 145 | 130 | 120 | — | — |
| Vulcanizate Physical Property | | Low-Heat-Generation Property (tanδ index) | 128 | 131 | 124 | 123 | 127 | 128 | 131 | 131 | 127 | 100 | 102 |

[Notes]
*1 to *10 are all the same as in Table 1 to Table 5, and *22 is the same as in Table 14.

TABLE 16

| | | part by mass | Example | | | | | |
|---|---|---|---|---|---|---|---|---|
| | | | 92 | 93 | 94 | 95 | 96 | 97 |
| Formulation | First Stage of Kneading | Emulsion-Polymerized SBR-C *13 | 68.75 | 68.75 | 68.75 | 68.75 | 68.75 | 68.75 |
| | | Solution-Polymerized SBR-D *14 | 68.75 | 68.75 | 68.75 | 68.75 | 68.75 | 68.75 |
| | | Carbon Black N220 *2 | 10 | 10 | 10 | 10 | 10 | 10 |
| | | Silica *3 | 80 | 80 | 80 | 80 | 80 | 80 |
| | | Silane Coupling Agent Si75 *4 | 6.5 | — | — | — | 6.5 | — |
| | | Silane Coupling Agent NXT *15 | — | 6.5 | — | — | — | 6.5 |
| | | Silane Coupling Agent NXT-Z *16 | — | — | 6.5 | — | — | — |
| | | Silane Coupling Agent *17 | — | — | — | 6.5 | — | — |
| | | Aromatic Oil | 5.0 | 5.0 | 5.0 | 5.0 | 5.0 | 5.0 |
| | | Stearic Acid | 2.0 | 2.0 | 2.0 | 2.0 | — | — |
| | | Antiaging Agent 6PPD *5 | 1.0 | 1.0 | 1.0 | 1.0 | — | — |
| | | Tetrakis(2-ethylhexyl)thiuram Disulfide *22 according to kneading method A | 1.0 | 1.0 | 1.0 | 1.0 | 1.0 | 1.0 |
| | | Tetrakis(2-ethylhexyl)thiuram Disulfide *22 according to kneading method B | — | — | — | — | — | — |

TABLE 16-continued

|  |  |  |  |  |  |  |  |  |
|---|---|---|---|---|---|---|---|---|
|  | Final Stage of Kneading | Stearic Acid | — | — | — | — | 2.0 | 2.0 |
|  |  | Antiaging Agent 6PPD *5 | — | — | — | — | 1.0 | 1.0 |
|  |  | Zinc Flower | 3.0 | 3.0 | 3.0 | 3.0 | 3.0 | 3.0 |
|  |  | 1,3-Diphenylguanidine *6 | 1.0 | 1.0 | 1.0 | 1.0 | 1.0 | 1.0 |
|  |  | Vulcanization Promoter MBTS *8 | 0.8 | 0.8 | 0.8 | 0.8 | 0.8 | 0.8 |
|  |  | Vulcanization Promoter CBS *18 | 1.5 | 1.5 | 1.5 | 1.5 | 1.5 | 1.5 |
|  |  | Sulfur | 1.5 | 1.5 | 1.5 | 1.5 | 1.5 | 1.5 |
| Time (sec) until addition of tetrakis(2-ethylhexyl)thiuram disulfide after addition of silica and silane coupling agent |  |  | 90 | 90 | 90 | 90 | 90 | 90 |
| Temperature (° C.) of rubber composition at addition of tetrakis(2-ethylhexyl)thiuram disulfide |  |  | 130 | 130 | 130 | 130 | 130 | 130 |
| Vulcanizate Physical Property | Low-Heat-Generation Property (tanδ index) |  | 130 | 128 | 126 | 140 | 133 | 130 |

|  |  |  | Example |  | Comparative Example |  |  |  |
|---|---|---|---|---|---|---|---|---|
|  |  | part by mass | 98 | 99 | 15 | 16 | 17 | 18 |
| Formulation | First Stage of Kneading | Emulsion-Polymerized SBR-C *13 | 68.75 | 68.75 | 68.75 | 68.75 | 68.75 | 68.75 |
|  |  | Solution-Polymerized SBR-D *14 | 68.75 | 68.75 | 68.75 | 68.75 | 68.75 | 68.75 |
|  |  | Carbon Black N220 *2 | 10 | 10 | 10 | 10 | 10 | 10 |
|  |  | Silica *3 | 80 | 80 | 80 | 80 | 80 | 80 |
|  |  | Silane Coupling Agent Si75 *4 | — | — | 6.5 | — | — | — |
|  |  | Silane Coupling Agent NXT *15 | — | — | — | 6.5 | — | — |
|  |  | Silane Coupling Agent NXT-Z *16 | 6.5 | — | — | — | 6.5 | — |
|  |  | Silane Coupling Agent *17 | — | 6.5 | — | — | — | 6.5 |
|  |  | Aromatic Oil | 5.0 | 5.0 | 5.0 | 5.0 | 5.0 | 5.0 |
|  |  | Stearic Acid | — | — | 2.0 | 2.0 | 2.0 | 2.0 |
|  |  | Antiaging Agent 6PPD *5 | — | — | 1.0 | 1.0 | 1.0 | 1.0 |
|  |  | Tetrakis(2-ethylhexyl)thiuram Disulfide *22 according to kneading method A | 1.0 | 1.0 | — | — | — | — |
|  |  | Tetrakis(2-ethylhexyl)thiuram Disulfide *22 according to kneading method B | — | — | — | — | — | — |
|  | Final Stage of Kneading | Stearic Acid | 2.0 | 2.0 | — | — | — | — |
|  |  | Antiaging Agent 6PPD *5 | 1.0 | 1.0 | — | — | — | — |
|  |  | Zinc Flower | 3.0 | 3.0 | 3.0 | 3.0 | 3.0 | 3.0 |
|  |  | 1,3-Diphenylguanidine *6 | 1.0 | 1.0 | 1.0 | 1.0 | 1.0 | 1.0 |
|  |  | Vulcanization Promoter MBTS *8 | 0.8 | 0.8 | 0.8 | 0.8 | 0.8 | 0.8 |
|  |  | Vulcanization Promoter CBS *18 | 1.5 | 1.5 | 1.5 | 1.5 | 1.5 | 1.5 |
|  |  | Sulfur | 1.5 | 1.5 | 1.5 | 1.5 | 1.5 | 1.5 |
| Time (sec) until addition of tetrakis(2-ethylhexyl)thiuram disulfide after addition of silica and silane coupling agent |  |  | 90 | 90 | — | — | — | — |
| Temperature (° C.) of rubber composition at addition of tetrakis(2-ethylhexyl)thiuram disulfide |  |  | 130 | 130 | — | — | — | — |
| Vulcanizate Physical Property | Low-Heat-Generation Property (tanδ index) |  | 126 | 143 | 100 | 115 | 110 | 112 |

[Notes]
*2 to *18 are all the same as in Table 1 to Table 5, and *22 is the same as in Table 14.

TABLE 17

|  |  |  |  | Example |  | Comparative Example |  |  |
|---|---|---|---|---|---|---|---|---|
|  |  | part by mass |  | 92 | 100 | 15 | 32 | 33 |
| Formulation | First Stage of Kneading | Emulsion-Polymerized SBR-C *13 |  | 68.75 | 68.75 | 68.75 | 68.75 | 68.75 |
|  |  | Solution-Polymerized SBR-D *14 |  | 68.75 | 68.75 | 68.75 | 68.75 | 68.75 |
|  |  | Carbon Black N220 *2 |  | 10 | 10 | 10 | 10 | 10 |
|  |  | Silica *3 |  | 80 | 80 | 80 | 80 | 80 |
|  |  | Silane Coupling Agent Si75 *4 |  | 6.5 | 6.5 | 6.5 | 6.5 | 6.5 |
|  |  | Aromatic Oil |  | 5.0 | 5.0 | 5.0 | 5.0 | 5.0 |
|  |  | Stearic Acid |  | 2.0 | 2.0 | 2.0 | 2.0 | 2.0 |
|  |  | Antiaging Agent 6PPD *5 |  | 1.0 | 1.0 | 1.0 | 1.0 | 1.0 |
|  |  | according to kneading method A | Tetrakis(2-ethylhexyl)thiuram Disulfide *22 | 1.0 | — | — | — | — |
|  |  |  | Tetrabenzylthiuram Disulfide *23 | — | 1.0 | — | — | — |
|  |  | according to kneading method B | Tetrakis(2-ethylhexyl)thiuram Disulfide *22 | — | — | — | 1.0 | — |
|  |  |  | Tetrabenzylthiuram Disulfide *23 | — | — | — | — | 1.0 |
|  | Final Stage of Kneading | Stearic Acid |  | — | — | — | — | — |
|  |  | Antiaging Agent 6PPD *5 |  | — | — | — | — | — |
|  |  | Zinc Flower |  | 3.0 | 3.0 | 3.0 | 3.0 | 3.0 |
|  |  | 1,3-Diphenylguanidine *6 |  | 1.0 | 1.0 | 1.0 | 1.0 | 1.0 |
|  |  | Vulcanization Promoter MBTS *8 |  | 0.8 | 0.8 | 0.8 | 0.8 | 0.8 |
|  |  | Vulcanization Promoter CBS *18 |  | 1.5 | 1.5 | 1.5 | 1.5 | 1.5 |
|  |  | Sulfur |  | 1.5 | 1.5 | 1.5 | 1.5 | 1.5 |

TABLE 17-continued

|  | | Example | | Comparative Example | | |
|---|---|---|---|---|---|---|
| part by mass | | 92 | 100 | 15 | 32 | 33 |
| Time (sec) until addition of thiurams after addition of silica and silane coupling agent | | 90 | 90 | — | 0 | 0 |
| Temperature (° C.) of rubber composition at addition of thiurams | | 130 | 130 | — | 65 | 65 |
| Vulcanizate Physical Property | Low-Heat-Generation Property (tanδ index) | 130 | 131 | 100 | 105 | 103 |

[Notes]
*2 to *18 are all the same as in Table 1 to Table 5, and *22 is the same as in Table 14.
*23: Sanshin Chemical's trade name "Sanceler TBZTD"

TABLE 18

|  |  |  | Example | | | | | | Comparative Example | | | | | |
|---|---|---|---|---|---|---|---|---|---|---|---|---|---|---|
| part by mass |  |  | 101 | 102 | 103 | 104 | 105 | 106 | 1 | 2 | 3 | 34 | 35 | 6 |
| Formulation | First Stage of Kneading | Emulsion-Polymerized SBR-A *1 | 100 | 100 | 100 | 100 | 100 | 100 | 100 | 100 | 100 | 100 | 100 | 100 |
|  |  | Carbon Black N220 *2 | 10 | 10 | 10 | — | 10 | 10 | 10 | 10 | 10 | 10 | 10 | — |
|  |  | Silica *3 | 50 | 50 | 50 | 60 | 50 | 50 | 50 | 50 | 50 | 50 | 50 | 60 |
|  |  | Silane Coupling Agent Si75 *4 | 4.0 | 4.0 | 4.0 | 4.8 | 4.0 | 4.0 | 4.0 | — | 4.0 | 4.0 | 4.0 | 4.8 |
|  |  | Aromatic Oil | 30 | 30 | 30 | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | — | — | 2.0 | 2.0 |
|  |  | Antiaging Agent 6PPD *5 | 1.0 | 1.0 | 1.0 | 1.0 | 1.0 | 1.0 | 1.0 | 1.0 | — | — | 1.0 | 1.0 |
|  |  | N,N'-diethylthiourea *24 according to kneading method A | 1.0 | 0.5 | 2.0 | 1.0 | 0.1 | 3.0 | — | — | — | — | — | — |
|  |  | N,N'-diethylthiourea *24 according to kneading method B | — | — | — | — | — | — | — | — | — | 1.0 | 1.0 | — |
|  | Final Stage of Kneading | Stearic Acid | — | — | — | — | — | — | — | — | 2.0 | 2.0 | — | — |
|  |  | Antiaging Agent 6PPD *5 | — | — | — | — | — | — | — | — | 1.0 | 1.0 | — | — |
|  |  | Antiaging Agent TMDQ *7 | 1.0 | 1.0 | 1.0 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 | 1.5 | 1.5 | 1.5 |
| Time (sec) until addition of N,N'-diethylthiourea after addition of silica and silane coupling agent | | | 90 | 90 | 90 | 90 | 90 | 90 | — | — | — | 0 | 0 | — |
| Temperature (° C.) of rubber composition at addition of N,N'-diethylthiourea | | | 130 | 130 | 130 | 130 | 130 | 130 | — | — | — | 70 | 70 | — |
| Vulcanizate Physical Property | Low-Heat-Generation Property (tanδ index) | | 122 | 121 | 122 | 126 | 118 | 122 | 100 | 101 | 104 | 103 | 102 | 102 |

[Notes]
*1 to *9 are all the same as in Table 1.
*24: Ouchi Shinko Chemical's trade name "Nocceler EUR"

TABLE 19

|  |  |  | Example | | | | | | | | | Comparative Example | |
|---|---|---|---|---|---|---|---|---|---|---|---|---|---|
| part by mass |  |  | 101 | 107 | 108 | 109 | 110 | 111 | 112 | 113 | 114 | 1 | 7 |
| Formulation | First Stage of Kneading | Emulsion-Polymerized SBR-A *1 | 100 | 100 | 100 | 100 | 100 | 100 | 100 | — | — | 100 | — |
|  |  | Solution-Polymerized SBR-B *10 | — | — | — | — | — | — | — | 100 | 100 | — | 100 |
|  |  | Carbon Black N220 *2 | 10 | 10 | 10 | 10 | 10 | 10 | 10 | 10 | 10 | 1 | 10 |
|  |  | Silica *3 | 50 | 50 | 50 | 50 | 50 | 50 | 50 | 50 | 50 | 50 | 50 |
|  |  | Silane Coupling Agent Si75 *4 | 4.0 | 4.0 | 4.0 | 4.0 | 4.0 | 4.0 | 4.0 | 4.0 | 4.0 | 4.0 | 4.0 |
|  |  | Aromatic Oil | 30 | 30 | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 | 1.0 | 1.0 | 1.0 |
|  |  | N,N'-diethylthiourea *24 according to kneading method A | 1.0 | 1.0 | 1.0 | 1.0 | 1.0 | 1.0 | 1.0 | 1.0 | 1.0 | — | — |
|  |  | N,N'-diethylthiourea *24 according to kneading method B | — | — | — | — | — | — | — | — | — | — | — |
|  | Final Stage of Kneading | Stearic Acid | — | — | — | — | — | — | — | — | — | — | — |
|  |  | Antiaging Agent 6PPD *5 | — | — | — | — | — | — | — | — | — | — | — |
|  |  | Antiaging Agent TMDQ *7 | 1.0 | 1.0 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 | 1.5 | 1.5 |

TABLE 19-continued

| part by mass | Example | | | | | | | | | Comparative Example | |
|---|---|---|---|---|---|---|---|---|---|---|---|
| | 101 | 107 | 108 | 109 | 110 | 111 | 112 | 113 | 114 | 1 | 7 |
| Time (sec) until addition of N,N'-diethylthiourea after addition of silica and silane coupling agent | 90 | 90 | 60 | 30 | 60 | 120 | 120 | 90 | 60 | — | — |
| Temperature (° C.) of rubber composition at addition of N,N'-diethylthiourea | 130 | 145 | 120 | 95 | 130 | 130 | 145 | 130 | 120 | — | — |
| Vulcanizate Physical Property  Low-Heat-Generation Property (tanδ index) | 122 | 125 | 118 | 117 | 121 | 123 | 125 | 125 | 121 | 100 | 102 |

[Notes]
*1 to *10 are all the same as in Table 1 and Table 2, and *24 is the same as in Table 18.

TABLE 20

| | | | Example | | | | | |
|---|---|---|---|---|---|---|---|---|
| | | part by mass | 115 | 116 | 117 | 118 | 119 | 120 |
| Formulation | First Stage of Kneading | Emulsion-Polymerized SBR-C *13 | 68.75 | 68.75 | 68.75 | 68.75 | 68.75 | 68.75 |
| | | Solution-Polymerized SBR-D *14 | 68.75 | 68.75 | 68.75 | 68.75 | 68.75 | 68.75 |
| | | Carbon Black N220 *2 | 10 | 10 | 10 | 10 | 10 | 10 |
| | | Silica *3 | 80 | 80 | 80 | 80 | 80 | 80 |
| | | Silane Coupling Agent Si75 *4 | 6.5 | — | — | — | 6.5 | — |
| | | Silane Coupling Agent NXT *15 | — | 6.5 | — | — | — | 6.5 |
| | | Silane Coupling Agent NXT-Z *16 | — | — | 6.5 | — | — | — |
| | | Silane Coupling Agent *17 | — | — | — | 6.5 | — | — |
| | | Aromatic Oil | 5.0 | 5.0 | 5.0 | 5.0 | 5.0 | 5.0 |
| | | Stearic Acid | 2.0 | 2.0 | 2.0 | 2.0 | — | — |
| | | Antiaging Agent 6PPD *5 | 1.0 | 1.0 | 1.0 | 1.0 | — | — |
| | | N,N'-diethylthiourea *24 according to kneading method A | 1.0 | 1.0 | 1.0 | 1.0 | 1.0 | 1.0 |
| | | N,N'-diethylthiourea *24 according to kneading method B | — | — | — | — | — | — |
| | Final Stage of Kneading | Stearic Acid | — | — | — | — | 2.0 | 2.0 |
| | | Antiaging Agent 6PPD *5 | — | — | — | — | 1.0 | 1.0 |
| | | Zinc Flower | 3.0 | 3.0 | 3.0 | 3.0 | 3.0 | 3.0 |
| | | 1,3-Diphenylguanidine *6 | 1.0 | 1.0 | 1.0 | 1.0 | 1.0 | 1.0 |
| | | Vulcanization Promoter MBTS *8 | 0.8 | 0.8 | 0.8 | 0.8 | 0.8 | 0.8 |
| | | Vulcanization Promoter CBS *18 | 1.5 | 1.5 | 1.5 | 1.5 | 1.5 | 1.5 |
| | | Sulfur | 1.5 | 1.5 | 1.5 | 1.5 | 1.5 | 1.5 |
| Time (sec) until addition of N,N'-diethylthiourea after addition of silica and silane coupling agent | | | 90 | 90 | 90 | 90 | 90 | 90 |
| Temperature (° C.) of rubber composition at addition of N,N'-diethylthiourea | | | 130 | 130 | 130 | 130 | 130 | 130 |
| Vulcanizate Physical Property  Low-Heat-Generation Property (tanδ index) | | | 124 | 125 | 122 | 128 | 126 | 125 |

| | | | Example | | Comparative Example | | | |
|---|---|---|---|---|---|---|---|---|
| | | part by mass | 121 | 122 | 15 | 16 | 17 | 18 |
| Formulation | First Stage of Kneading | Emulsion-Polymerized SBR-C *13 | 68.75 | 68.75 | 68.75 | 68.75 | 68.75 | 68.75 |
| | | Solution-Polymerized SBR-D *14 | 68.75 | 68.75 | 68.75 | 68.75 | 68.75 | 68.75 |
| | | Carbon Black N220 *2 | 10 | 10 | 10 | 10 | 10 | 10 |
| | | Silica *3 | 80 | 80 | 80 | 80 | 80 | 80 |
| | | Silane Coupling Agent Si75 *4 | — | — | 6.5 | — | — | — |
| | | Silane Coupling Agent NXT *15 | — | — | — | 6.5 | — | — |
| | | Silane Coupling Agent NXT-Z *16 | 6.5 | — | — | — | 6.5 | — |
| | | Silane Coupling Agent *17 | — | 6.5 | — | — | — | 6.5 |
| | | Aromatic Oil | 5.0 | 5.0 | 5.0 | 5.0 | 5.0 | 5.0 |
| | | Stearic Acid | — | — | 2.0 | 2.0 | 2.0 | 2.0 |
| | | Antiaging Agent 6PPD *5 | — | — | 1.0 | 1.0 | 1.0 | 1.0 |
| | | N,N'-diethylthiourea *24 according to kneading method A | 1.0 | 1.0 | — | — | — | — |
| | | N,N'-diethylthiourea *24 according to kneading method B | — | — | — | — | — | — |
| | Final Stage of Kneading | Stearic Acid | 2.0 | 2.0 | — | — | — | — |
| | | Antiaging Agent 6PPD *5 | 1.0 | 1.0 | — | — | — | — |
| | | Zinc Flower | 3.0 | 3.0 | 3.0 | 3.0 | 3.0 | 3.0 |
| | | 1,3-Diphenylguanidine *6 | 1.0 | 1.0 | 1.0 | 1.0 | 1.0 | 1.0 |
| | | Vulcanization Promoter MBTS *8 | 0.8 | 0.8 | 0.8 | 0.8 | 0.8 | 0.8 |
| | | Vulcanization Promoter CBS *18 | 1.5 | 1.5 | 1.5 | 1.5 | 1.5 | 1.5 |
| | | Sulfur | 1.5 | 1.5 | 1.5 | 1.5 | 1.5 | 1.5 |

TABLE 20-continued

| | | | | | | |
|---|---|---|---|---|---|---|
| Time (sec) until addition of N,N'-diethylthiourea after addition of silica and silane coupling agent | 90 | 90 | — | — | — | — |
| Temperature (° C.) of rubber composition at addition of N,N'-diethylthiourea | 130 | 130 | — | — | — | — |
| Vulcanizate Physical Property Low-Heat-Generation Property (tanδ index) | 124 | 130 | 100 | 115 | 110 | 112 |

[Notes]
*2 to *18 are all the same as in Table 1 to Table 5, and *24 is the same as in Table 18.

TABLE 21

| | | | | Example | | | Comparative Example | | | |
|---|---|---|---|---|---|---|---|---|---|---|
| | | part by mass | 115 | 123 | 124 | 15 | 36 | 37 | 38 |
| Formulation | First Stage of Kneading | Emulsion-Polymerized SBR-C *13 | 68.75 | 68.75 | 68.75 | 68.75 | 68.75 | 68.75 | 68.75 |
| | | Solution-Polymerized SBR-D *14 | 68.75 | 68.75 | 68.75 | 68.75 | 68.75 | 68.75 | 68.75 |
| | | Carbon Black N220 *2 | 10 | 10 | 10 | 10 | 10 | 10 | 10 |
| | | Silica *3 | 80 | 80 | 80 | 80 | 80 | 80 | 80 |
| | | Silane Coupling Agent Si75 *4 | 6.5 | 6.5 | 6.5 | 6.5 | 6.5 | 6.5 | 6.5 |
| | | Aromatic Oil | 5.0 | 5.0 | 5.0 | 5.0 | 5.0 | 5.0 | 5.0 |
| | | Stearic Acid | 2.0 | 2.0 | 2.0 | 2.0 | 2.0 | 2.0 | 2.0 |
| | | Antiaging Agent 6PPD *5 | 1.0 | 1.0 | 1.0 | 1.0 | 1.0 | 1.0 | 1.0 |
| | according to kneading method A | N,N'-diethylthiourea *24 | 1.0 | — | — | — | — | — | — |
| | | Trimethylthiourea *25 | — | 1.0 | — | — | — | — | — |
| | | N,N,'-diphenylthiourea *26 | — | — | 1.0 | — | — | — | — |
| | according to kneading method B | N,N'-diethylthiourea *24 | — | — | — | — | 1.0 | — | — |
| | | Trimethylthiourea *25 | — | — | — | — | — | 1.0 | — |
| | | N,N'-diphenylthiourea *26 | — | — | — | — | — | — | 1.0 |
| | Final Stage of Kneading | Stearic Acid | — | — | — | — | — | — | — |
| | | Antiaging Agent 6PPD *5 | — | — | — | — | — | — | — |
| | | Zinc Flower | 3.0 | 3.0 | 3.0 | 3.0 | 3.0 | 3.0 | 3.0 |
| | | 1,3-Diphenylguanidine *6 | 1.0 | 1.0 | 1.0 | 1.0 | 1.0 | 1.0 | 1.0 |
| | | Vulcanization Promoter MBTS *8 | 0.8 | 0.8 | 0.8 | 0.8 | 0.8 | 0.8 | 0.8 |
| | | Vulcanization Promoter CBS *18 | 1.5 | 1.5 | 1.5 | 1.5 | 1.5 | 1.5 | 1.5 |
| | | Sulfur | 1.5 | 1.5 | 1.5 | 1.5 | 1.5 | 1.5 | 1.5 |
| Time (sec) until addition of thioureas after addition of silica and silane coupling agent | | | 90 | 90 | 90 | — | 0 | 0 | 0 |
| Temperature (° C.) of rubber composition at addition of thioureas | | | 130 | 130 | 130 | — | 65 | 65 | 65 |
| Vulcanizate Physical Property Low-Heat-Generation Property (tanδ index) | | | 124 | 121 | 125 | 100 | 105 | 103 | 103 |

[Notes]
*2 to *18 are all the same as in Table 1 to Table 5, and *24 is the same as in Table 18.
*25: Sanshin Chemical's trade name "Sanceler TMU"
*26: Ouchi Shinko Chemical's trade name "Nocceler C"

TABLE 22

| | | | | | Example | | | | | Comparative Example | | | |
|---|---|---|---|---|---|---|---|---|---|---|---|---|---|
| | | part by mass | 125 | 126 | 127 | 128 | 129 | 130 | 1 | 2 | 3 | 39 | 40 | 6 |
| Formulation | First Stage of Kneading | Emulsion-Polymerized SBR-A *1 | 100 | 100 | 100 | 100 | 100 | 100 | 100 | 100 | 100 | 100 | 100 | 100 |
| | | Carbon Black N220 *2 | 10 | 10 | 10 | — | 10 | 10 | 10 | 10 | 10 | 10 | 10 | — |
| | | Silica*3 | 50 | 50 | 50 | 60 | 50 | 50 | 50 | 50 | 50 | 50 | 50 | 60 |
| | | Silane Coupling Agent Si75 *4 | 4.0 | 4.0 | 4.0 | 4.8 | 4.0 | 4.0 | 4.0 | — | 4.0 | 4.0 | 4.0 | 4.8 |
| | | Aromatic Oil | 30 | 30 | 30 | 30 | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 | — | — | 2.0 | 2.0 |
| | | Antiaging Agent 6PPD *5 | 1.0 | 1.0 | 1.0 | 1.0 | 1.0 | 1.0 | 1.0 | 1.0 | — | — | 1.0 | 1.0 |
| | | Zinc Dibenzyldithiocarbamate *27 according to kneading method A | 1.0 | 0.5 | 2.0 | 1.0 | 0.1 | 3.0 | — | — | — | — | — | — |
| | | Zinc Dibenzyldithiocarbamate *27 according to kneading method B | — | — | — | — | — | — | — | — | — | 1.0 | 1.0 | — |
| | Final Stage of Kneading | Stearic Acid | — | — | — | — | — | — | — | — | 2.0 | 2.0 | — | — |
| | | Antiaging Agent 6PPD *5 | — | — | — | — | — | — | — | — | 1.0 | 1.0 | — | — |
| | | Antiaging Agent TMDQ *7 | 1.0 | 1.0 | 1.0 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 |
| | | Vulcanization Promoter TBBS*9 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 |

TABLE 22-continued

|  | part by mass | Example | | | | | | Comparative Example | | | | | |
| --- | --- | --- | --- | --- | --- | --- | --- | --- | --- | --- | --- | --- | --- |
|  |  | 125 | 126 | 127 | 128 | 129 | 130 | 1 | 2 | 3 | 39 | 40 | 6 |
| Time (sec) until addition of zinc dibenzyldithiocarbamate after addition of silica and silane coupling agent | | 90 | 90 | 90 | 90 | 90 | 90 | — | — | — | 0 | 0 | — |
| Temperature (° C.) of rubber composition at addition of zinc dibenzyldithiocarbamate | | 130 | 130 | 130 | 130 | 130 | 130 | — | — | — | 70 | 70 | — |
| Vulcanizate Physical Property | Low-Heat-Generation Property (tanδ index) | 133 | 129 | 132 | 136 | 124 | 132 | 100 | 101 | 104 | 105 | 105 | 102 |

[Notes]
*1 to *9 are all the same as in Table 1.
*27: Ouchi Shinko Chemical's trade name "Nocceler ZTC"

TABLE 23

|  |  |  | Example | | | | | | | | | Comparative Example | |
| --- | --- | --- | --- | --- | --- | --- | --- | --- | --- | --- | --- | --- | --- |
|  |  | part by mass | 125 | 131 | 132 | 133 | 134 | 135 | 136 | 137 | 138 | 1 | 7 |
| Formulation | First Stage of Kneading | Emulsion-Polymerized SBR-A *1 | 100 | 100 | 100 | 100 | 100 | 100 | 100 | — | — | 100 | — |
|  |  | Emulsion-Polymerized SBR-B *10 | — | — | — | — | — | — | — | 100 | 100 | — | 100 |
|  |  | Carbon Black N220 *2 | 10 | 10 | 10 | 10 | 10 | 10 | 10 | 10 | 10 | 10 | 10 |
|  |  | Silica *3 | 50 | 50 | 50 | 50 | 50 | 50 | 50 | 50 | 50 | 50 | 50 |
|  |  | Silane Coupling Agent Si75 *4 | 4.0 | 4.0 | 4.0 | 4.0 | 4.0 | 4.0 | 4.0 | 4.0 | 4.0 | 4.0 | 4.0 |
|  |  | Aromatic Oil | 30 | 30 | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 | 1.0 | 1.0 | 1.0 |
|  |  | Zinc Dibenzyldithiocarbamate *27 according to kneading method A | 1.0 | 1.0 | 1.0 | 1.0 | 1.0 | 1.0 | 1.0 | 1.0 | 1.0 | — | — |
|  |  | Zinc Dibenzyldithiocarbamate *27 according to kneading method B | — | — | — | — | — | — | — | — | — | — | — |
|  | Final Stage of Kneading | Stearic Acid | — | — | — | — | — | — | — | — | — | — | — |
|  |  | Antiaging Agent 6PPD *5 | — | — | — | — | — | — | — | — | — | — | — |
|  |  | Antiaging Agent TMDQ *7 | 1.0 | 1.0 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 | 1.5 | 1.5 |
| Time (sec) until addition of zinc dibenzyldithiocarbamate after addition of silica and silane coupling agent | | | 90 | 90 | 60 | 30 | 60 | 120 | 120 | 90 | 60 | — | — |
| Temperature (° C.) of rubber composition at addition of zinc dibenzyldithiocarbamate | | | 130 | 145 | 120 | 95 | 130 | 130 | 145 | 130 | 120 | — | — |
| Vulcanizate Physical Property | Low-Heat-Generation Property (tanδ index) | | 133 | 136 | 126 | 125 | 131 | 136 | 140 | 138 | 130 | 100 | 102 |

[Notes]
*1 to *10 are all the same as in Table 1 and Table 2, and *27 is the same as in Table 22.

TABLE 24

|  |  |  | Example | | | | | |
| --- | --- | --- | --- | --- | --- | --- | --- | --- |
|  |  | part by mass | 139 | 140 | 141 | 142 | 143 | 144 |
| Formulation | First Stage of Kneading | Emulsion-Polymerized SBR-C *13 | 68.75 | 68.75 | 68.75 | 68.75 | 68.75 | 68.75 |
|  |  | Solution-Polymerized SBR-D *14 | 68.75 | 68.75 | 68.75 | 68.75 | 68.75 | 68.75 |
|  |  | Carbon Black N220 *2 | 10 | 10 | 10 | 10 | 10 | 10 |
|  |  | Silica *3 | 80 | 80 | 80 | 80 | 80 | 80 |
|  |  | Silane Coupling Agent Si75 *4 | 6.5 | — | — | — | 6.5 | — |
|  |  | Silane Coupling Agent NXT *15 | — | 6.5 | — | — | — | 6.5 |
|  |  | Silane Coupling Agent NXT-Z *16 | — | — | 6.5 | — | — | — |
|  |  | Silane Coupling Agent *17 | — | — | — | 6.5 | — | — |
|  |  | Aromatic Oil | 5.0 | 5.0 | 5.0 | 5.0 | 5.0 | 5.0 |
|  |  | Stearic Acid | 2.0 | 2.0 | 2.0 | 2.0 | — | — |
|  |  | Antiaging Agent 6PPD *5 | 1.0 | 1.0 | 1.0 | 1.0 | — | — |
|  |  | Zinc Dibenzyldithiocarbamate *27 according to kneading method A | 1.0 | 1.0 | 1.0 | 1.0 | 1.0 | 1.0 |
|  |  | Zinc Dibenzyldithiocarbamate *27 according to kneading method B | — | — | — | — | — | — |

TABLE 24-continued

|  |  |  | | | | | | |
|---|---|---|---|---|---|---|---|---|
| Final Stage of Kneading | Stearic Acid | — | — | — | — | 2.0 | 2.0 |
| | Antiaging Agent 6PPD *5 | — | — | — | — | 1.0 | 1.0 |
| | Zinc Flower | 3.0 | 3.0 | 3.0 | 3.0 | 3.0 | 3.0 |
| | 1,3-Diphenylguanidine *6 | 1.0 | 1.0 | 1.0 | 1.0 | 1.0 | 1.0 |
| | Vulcanization Promoter MBTS *8 | 0.8 | 0.8 | 0.8 | 0.8 | 0.8 | 0.8 |
| | Vulcanization Promoter CBS *18 | 1.5 | 1.5 | 1.5 | 1.5 | 1.5 | 1.5 |
| | Sulfur | 1.5 | 1.5 | 1.5 | 1.5 | 1.5 | 1.5 |
| Time (sec) until addition of zinc dibenzyldithiocarbamate after addition of silica and silane coupling agent | | 90 | 90 | 90 | 90 | 90 | 90 |
| Temperature (° C.) of rubber composition at addition of zinc dibenzyldithiocarbamate | | 130 | 130 | 130 | 130 | 130 | 130 |
| Vulcanizate Physical Property | Low-Heat-Generation Property (tanδ index) | 130 | 132 | 129 | 141 | 134 | 133 |

|  |  |  | Example | | Comparative Example | | | |
|---|---|---|---|---|---|---|---|---|
|  |  | part by mass | 145 | 146 | 15 | 16 | 17 | 18 |
| Formulation | First Stage of Kneading | Emulsion-Polymerized SBR-C *13 | 68.75 | 68.75 | 68.75 | 68.75 | 68.75 | 68.75 |
| | | Solution-Polymerized SBR-D *14 | 68.75 | 68.75 | 68.75 | 68.75 | 68.75 | 68.75 |
| | | Carbon Black N220 *2 | 10 | 10 | 10 | 10 | 10 | 10 |
| | | Silica *3 | 80 | 80 | 80 | 80 | 80 | 80 |
| | | Silane Coupling Agent Si75 *4 | — | — | 6.5 | — | — | — |
| | | Silane Coupling Agent NXT *15 | — | — | — | 6.5 | — | — |
| | | Silane Coupling Agent NXT-Z *16 | 6.5 | — | — | — | 6.5 | — |
| | | Silane Coupling Agent *17 | — | 6.5 | — | — | — | 6.5 |
| | | Aromatic Oil | 5.0 | 5.0 | 5.0 | 5.0 | 5.0 | 5.0 |
| | | Stearic Acid | — | — | 2.0 | 2.0 | 2.0 | 2.0 |
| | | Antiaging Agent 6PPD *5 | — | — | 1.0 | 1.0 | 1.0 | 1.0 |
| | | Zinc Dibenzyldithiocarbamate *27 according to kneading method A | 1.0 | 1.0 | — | — | — | — |
| | | Zinc Dibenzyldithiocarbamate *27 according to kneading method B | — | — | — | — | — | — |
| | Final Stage of Kneading | Stearic Acid | 2.0 | 2.0 | — | — | — | — |
| | | Antiaging Agent 6PPD *5 | 1.0 | 1.0 | — | — | — | — |
| | | Zinc Flower | 3.0 | 3.0 | 3.0 | 3.0 | 3.0 | 3.0 |
| | | 1,3-Diphenylguanidine *6 | 1.0 | 1.0 | 1.0 | 1.0 | 1.0 | 1.0 |
| | | Vulcanization Promoter MBTS *8 | 0.8 | 0.8 | 0.8 | 0.8 | 0.8 | 0.8 |
| | | Vulcanization Promoter CBS *18 | 1.5 | 1.5 | 1.5 | 1.5 | 1.5 | 1.5 |
| | | Sulfur | 1.5 | 1.5 | 1.5 | 1.5 | 1.5 | 1.5 |
| Time (sec) until addition of zinc dibenzyldithiocarbamate after addition of silica and silane coupling agent | | | 90 | 90 | — | — | — | — |
| Temperature (° C.) of rubber composition at addition of zinc dibenzyldithiocarbamate | | | 130 | 130 | — | — | — | — |
| Vulcanizate Physical Property | Low-Heat-Generation Property (tanδ index) | | 130 | 146 | 100 | 115 | 110 | 112 |

[Notes]
*2 to *18 are all the same as in Table 1 to Table 5, and *27 is the same as in Table 22.

TABLE 25

|  |  |  |  | Example | | | | Comparative Example | | | | |
|---|---|---|---|---|---|---|---|---|---|---|---|---|
|  |  | part by mass | | 139 | 147 | 148 | 149 | 15 | 41 | 42 | 43 | 44 |
| Formulation | First Stage of Kneading | Emulsion-Polymerized SBR-C *13 | | 68.75 | 68.75 | 68.75 | 68.75 | 68.75 | 68.75 | 68.75 | 68.75 | 68.75 |
| | | Solution-Polymerized SBR-D *14 | | 68.75 | 68.75 | 68.75 | 68.75 | 68.75 | 68.75 | 68.75 | 68.75 | 68.75 |
| | | Carbon Black N220 *2 | | 10 | 10 | 10 | 10 | 10 | 10 | 10 | 10 | 10 |
| | | Silica *3 | | 80 | 80 | 80 | 80 | 80 | 80 | 80 | 80 | 80 |
| | | Silane Coupling Agent Si75 *4 | | 6.5 | 6.5 | 6.5 | 6.5 | 6.5 | 6.5 | 6.5 | 6.5 | 6.5 |
| | | Aromatic Oil | | 5.0 | 5.0 | 5.0 | 5.0 | 5.0 | 5.0 | 5.0 | 5.0 | 5.0 |
| | | Stearic Acid | | 2.0 | 2.0 | 2.0 | 2.0 | 2.0 | 2.0 | 2.0 | 2.0 | 2.0 |
| | | Antiaging Agent 6PPD *5 | | 1.0 | 1.0 | 1.0 | 1.0 | 1.0 | 1.0 | 1.0 | 1.0 | 1.0 |
| | | according to kneading method A | Zinc Dibenzyl-dithiocarbamate *27 | 1.0 | — | — | — | — | — | — | — | — |
| | | | Zinc N-ethyl-N-phenyldithiocarbamate *28 | — | 1.0 | — | — | — | — | — | — | — |
| | | | Zinc dimethyl-dithiocarbamate *29 | — | — | 1.0 | — | — | — | — | — | — |
| | | | Copper Dimethyl-dithiocarbamate *30 | — | — | — | 1.0 | — | — | — | — | — |

TABLE 25-continued

|  |  |  | Example |  |  |  | Comparative Example |  |  |  |  |
|---|---|---|---|---|---|---|---|---|---|---|---|
|  | part by mass |  | 139 | 147 | 148 | 149 | 15 | 41 | 42 | 43 | 44 |
|  | according to kneading method B | Zinc Dibenzyl-dithiocarbamate *27 | — | — | — | — | — | 1.0 | — | — | — |
|  |  | Zinc N-ethyl-N-phenyldithiocarbamate *28 | — | — | — | — | — | — | 1.0 | — | — |
|  |  | Zinc dimethyl-dithiocarbamate *29 | — | — | — | — | — | — | — | 1.0 | — |
|  |  | Copper Dimethyl-dithiocarbamate *30 | — | — | — | — | — | — | — | — | 1.0 |
| Final Stage of Kneading | Stearic Acid |  | — | — | — | — | — | — | — | — | — |
|  | Antiaging Agent 6PPD *5 |  | — | — | — | — | — | — | — | — | — |
|  | Zinc Flower |  | 3.0 | 3.0 | 3.0 | 3.0 | 3.0 | 3.0 | 3.0 | 3.0 | 3.0 |
|  | 1,3-Diphenylguanidine *6 |  | 1.0 | 1.0 | 1.0 | 1.0 | 1.0 | 1.0 | 1.0 | 1.0 | 1.0 |
|  | Vulcanization Promoter MBTS *8 |  | 0.8 | 0.8 | 0.8 | 0.8 | 0.8 | 0.8 | 0.8 | 0.8 | 0.8 |
|  | Vulcanization Promoter CBS *18 |  | 1.5 | 1.5 | 1.5 | 1.5 | 1.5 | 1.5 | 1.5 | 1.5 | 1.5 |
|  | Sulfur |  | 1.5 | 1.5 | 1.5 | 1.5 | 1.5 | 1.5 | 1.5 | 1.5 | 1.5 |
| Time (sec) until addition of dithiocarbamate salts after addition of silica and silane coupling agent |  |  | 90 | 90 | 90 | 90 | — | 0 | 0 | 0 | 0 |
| Temperature (° C.) of rubber composition at addition of dithiocarbamate salts |  |  | 130 | 130 | 130 | 130 | — | 65 | 65 | 65 | 65 |
| Vulcanizate Physical Property | Low-Heat-Generation Property (tanδ index) |  | 130 | 131 | 130 | 126 | 100 | 105 | 105 | 106 | 103 |

[Notes]
*2 to *18 are all the same as in Table 1 to Table 5, and *27 is the same as in Table 22.
*28: Sanshin Chemical's trade name "Sanceler PX"
*29: Sanshin Chemical's trade name "Sanceler PZ"
*30: Sanshin Chemical's trade name "Sanceler TT-CU"

TABLE 26

|  |  |  | Example |  |  |  |  |  | Comparative Example |  |  |  |  |  |
|---|---|---|---|---|---|---|---|---|---|---|---|---|---|---|
|  | part by mass |  | 150 | 151 | 152 | 153 | 154 | 155 | 1 | 2 | 3 | 4 | 5 | 6 |
| Formulation | First Stage of Kneading | Emulsion-Polymerized SBR-A *1 | 100 | 100 | 100 | 100 | 100 | 100 | 100 | 100 | 100 | 100 | 100 | 100 |
|  |  | Carbon Black N220 *2 | 10 | 10 | 10 | — | 10 | 10 | 10 | 10 | 10 | 10 | 10 | — |
|  |  | Silica *3 | 50 | 50 | 50 | 60 | 50 | 50 | 50 | 50 | 50 | 50 | 50 | 60 |
|  |  | Silane Coupling Agent Si75 *4 | 4.0 | 4.0 | 4.0 | 4.8 | 4.0 | 4.0 | 4.0 | — | 4.0 | 4.0 | 4.0 | 4.8 |
|  |  | Aromatic Oil | 30 | 30 | 30 | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | — | — | 2.0 | 2.0 |
|  |  | Antiaging Agent 6PPD *5 | 1.0 | 1.0 | 1.0 | 1.0 | 1.0 | 1.0 | 1.0 | 1.0 | — | — | 1.0 | 1.0 |
|  |  | Zinc Isopropylxanthate *31 according to kneading method A | 1.0 | 0.5 | 2.0 | 1.0 | 0.1 | 3.0 | — | — | — | — | — | — |
|  |  | Zinc Isopropylxanthate *31 according to kneading method B | — | — | — | — | — | — | — | — | — | 1.0 | 1.0 | — |
|  | Final Stage of Kneading | Stearic Acid | — | — | — | — | — | — | — | — | 2.0 | 2.0 | — | — |
|  |  | Antiaging Agent 6PPD *5 | — | — | — | — | — | — | — | — | 1.0 | 1.0 | — | — |
|  |  | Antiaging Agent TMDQ *7 | 1.0 | 1.0 | 1.0 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 | 1.5 | 1.5 | 1.5 |
| Time (sec) until addition of zinc isopropylxanthate after addition of silica and silane coupling agent |  |  | 90 | 90 | 90 | 90 | 90 | 90 | — | — | — | 0 | 0 | — |
| Temperature (° C.) of rubber composition at addition of zinc isopropylxanthate |  |  | 130 | 130 | 130 | 130 | 130 | 130 | — | — | — | 70 | 70 | — |
| Vulcanizate Physical Property | Low-Heat-Generation Property (tanδ index) |  | 121 | 120 | 121 | 124 | 118 | 121 | 100 | 101 | 104 | 103 | 103 | 102 |

[Notes]
*1 to *9 are all the same as in Table 1.
*31: Ouchi Shinko Chemical's trade name "Nocceler ZIX-O"

TABLE 27

|  |  |  | Example |  |  |  |  |  |  |  |  | Comparative Example |  |
|---|---|---|---|---|---|---|---|---|---|---|---|---|---|
|  | part by mass |  | 150 | 156 | 157 | 158 | 159 | 160 | 161 | 162 | 163 | 1 | 7 |
| Formulation | First Stage of Kneading | Emulsion-Polymerized SBR-A *1 | 100 | 100 | 100 | 100 | 100 | 100 | 100 | — | — | 100 | — |
|  |  | Emulsion-Polymerized SBR-B *10 | — | — | — | — | — | — | — | 100 | 100 | — | 100 |
|  |  | Carbon Black N220 *2 | 10 | 10 | 10 | 10 | 10 | 10 | 10 | 10 | 10 | 10 | 10 |
|  |  | Silica *3 | 50 | 50 | 50 | 50 | 50 | 50 | 50 | 50 | 50 | 50 | 50 |

TABLE 27-continued

|  |  | part by mass | Example 150 | Example 156 | Example 157 | Example 158 | Example 159 | Example 160 | Example 161 | Example 162 | Example 163 | Comparative Example 1 | Comparative Example 7 |
|---|---|---|---|---|---|---|---|---|---|---|---|---|---|
|  |  | Silane Coupling Agent Si75 *4 | 4.0 | 4.0 | 4.0 | 4.0 | 4.0 | 4.0 | 4.0 | 4.0 | 4.0 | 4.0 | 4.0 |
|  |  | Aromatic Oil | 30 | 30 | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | 2.0 | 2.0 | 2.0 |
|  |  | Antiaging Agent 6PPD *5 | 1.0 | 1.0 | 1.0 | 1.0 | 1.0 | 1.0 | 1.0 | 1.0 | 1.0 | 1.0 | 1.0 |
|  |  | Zinc Isopropylxanthate *31 according to kneading method A | 1.0 | 1.0 | 1.0 | 1.0 | 1.0 | 1.0 | 1.0 | 1.0 | 1.0 | — | — |
|  |  | Zinc Isopropylxanthate *31 according to kneading method B | — | — | — | — | — | — | — | — | — | — | — |
|  | Final Stage of Kneading | Stearic Acid | — | — | — | — | — | — | — | — | — | — | — |
|  |  | Antiaging Agent 6PPD *5 | — | — | — | — | — | — | — | — | — | — | — |
|  |  | Antiaging Agent TMDQ *7 | 1.0 | 1.0 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 | 1.5 | 1.5 |
| Time (sec) until addition of zinc isopropylxanthate after addition of silica and silane coupling agent |  |  | 90 | 90 | 60 | 30 | 60 | 120 | 120 | 90 | 60 | — | — |
| Temperature (° C.) of rubber composition at addition of zinc isopropylxanthate |  |  | 130 | 145 | 120 | 95 | 130 | 130 | 145 | 130 | 120 | — | — |
| Vulcanizate Physical Property | Low-Heat-Generation Property (tanδ index) |  | 121 | 123 | 120 | 119 | 121 | 122 | 123 | 122 | 122 | 100 | 102 |

[Notes]
*1 to *10 are all the same as in Table 1 and Table 2, and *31 is the same as in Table 26.

TABLE 28

|  |  | part by weight | Example 164 | Example 165 | Example 166 | Example 167 | Example 168 | Example 169 |
|---|---|---|---|---|---|---|---|---|
| Formulation | First Stage of Kneading | Emulsion-Polymerized SBR-C *13 | 68.75 | 68.75 | 68.75 | 68.75 | 68.75 | 68.75 |
|  |  | Solution-Polymerized SBR-D *14 | 68.75 | 68.75 | 68.75 | 68.75 | 68.75 | 68.75 |
|  |  | Carbon Black N220 *2 | 10 | 10 | 10 | 10 | 10 | 10 |
|  |  | Silica *3 | 80 | 80 | 80 | 80 | 80 | 80 |
|  |  | Silane Coupling Agent Si75 *4 | 6.5 | — | — | — | 6.5 | — |
|  |  | Silane Coupling Agent NXT *15 | — | 6.5 | — | — | — | 6.5 |
|  |  | Silane Coupling Agent NXT-Z *16 | — | — | 6.5 | — | — | — |
|  |  | Silane Coupling Agent *17 | — | — | — | 6.5 | — | — |
|  |  | Aromatic Oil | 5.0 | 5.0 | 5.0 | 5.0 | 5.0 | 5.0 |
|  |  | Stearic Acid | 2.0 | 2.0 | 2.0 | 2.0 | — | — |
|  |  | Antiaging Agent 6PPD *5 | 1.0 | 1.0 | 1.0 | 1.0 | — | — |
|  |  | Zinc Isopropylxanthate *31 according to kneading method A | 1.0 | 1.0 | 1.0 | 1.0 | 1.0 | 1.0 |
|  |  | Zinc Isopropylxanthate *31 according to kneading method B | — | — | — | — | — | — |
|  | Final Stage of Kneading | Stearic Acid | — | — | — | — | 2.0 | 2.0 |
|  |  | Antiaging Agent 6PPD *5 | — | — | — | — | 1.0 | 1.0 |
|  |  | Zinc Flower | 3.0 | 3.0 | 3.0 | 3.0 | 3.0 | 3.0 |
|  |  | 1,3-Diphenylguanidine *6 | 1.0 | 1.0 | 1.0 | 1.0 | 1.0 | 1.0 |
|  |  | Vulcanization Promoter MBTS *8 | 0.8 | 0.8 | 0.8 | 0.8 | 0.8 | 0.8 |
|  |  | Vulcanization Promoter CBS *18 | 1.5 | 1.5 | 1.5 | 1.5 | 1.5 | 1.5 |
|  |  | Sulfur | 1.5 | 1.5 | 1.5 | 1.5 | 1.5 | 1.5 |
| Time (sec) until addition of zinc isopropylxanthate after addition of silica and silane coupling agent |  |  | 90 | 90 | 90 | 90 | 90 | 90 |
| Temperature (° C.) of rubber composition at addition of zinc isopropylxanthate |  |  | 130 | 130 | 130 | 130 | 130 | 130 |
| Vulcanizate Physical Property | Low-Heat-Generation Property (tanδ index) |  | 123 | 125 | 121 | 130 | 124 | 125 |

|  |  | part by weight | Example 170 | Example 171 | Comparative Example 15 | Comparative Example 16 | Comparative Example 17 | Comparative Example 18 |
|---|---|---|---|---|---|---|---|---|
| Formulation | First Stage of Kneading | Emulsion-Polymerized SBR-C *13 | 68.75 | 68.75 | 68.75 | 68.75 | 68.75 | 68.75 |
|  |  | Solution-Polymerized SBR-D *14 | 68.75 | 68.75 | 68.75 | 68.75 | 68.75 | 68.75 |
|  |  | Carbon Black N220 *2 | 10 | 10 | 10 | 10 | 10 | 10 |
|  |  | Silica *3 | 80 | 80 | 80 | 80 | 80 | 80 |
|  |  | Silane Coupling Agent Si75 *4 | — | — | 6.5 | — | — | — |
|  |  | Silane Coupling Agent NXT *15 | — | — | — | 6.5 | — | — |
|  |  | Silane Coupling Agent NXT-Z *16 | 6.5 | — | — | — | 6.5 | — |
|  |  | Silane Coupling Agent *17 | — | 6.5 | — | — | — | 6.5 |

TABLE 28-continued

|  |  |  |  |  |  |  |  |
|---|---|---|---|---|---|---|---|
|  | Aromatic Oil | 5.0 | 5.0 | 5.0 | 5.0 | 5.0 | 5.0 |
|  | Stearic Acid | — | — | 2.0 | 2.0 | 2.0 | 2.0 |
|  | Antiaging Agent 6PPD *5 | — | — | 1.0 | 1.0 | 1.0 | 1.0 |
|  | Zinc Isopropylxanthate *31 according to kneading method A | 1.0 | 1.0 | — | — | — | — |
|  | Zinc Isopropylxanthate *31 according to kneading method B | — | — | — | — | — | — |
| Final Stage of Kneading | Stearic Acid | 2.0 | 2.0 | — | — | — | — |
|  | Antiaging Agent 6PPD *5 | 1.0 | 1.0 | — | — | — | — |
|  | Zinc Flower | 3.0 | 3.0 | 3.0 | 3.0 | 3.0 | 3.0 |
|  | 1,3-Diphenylguanidine *6 | 1.0 | 1.0 | 1.0 | 1.0 | 1.0 | 1.0 |
|  | Vulcanization Promoter MBTS *8 | 0.8 | 0.8 | 0.8 | 0.8 | 0.8 | 0.8 |
|  | Vulcanization Promoter CBS *18 | 1.5 | 1.5 | 1.5 | 1.5 | 1.5 | 1.5 |
|  | Sulfur | 1.5 | 1.5 | 1.5 | 1.5 | 1.5 | 1.5 |
| Time (sec) until addition of zinc isopropylxanthate after addition of silica and silane coupling agent | | 90 | 90 | — | — | — | — |
| Temperature (° C.) of rubber composition at addition of zinc isopropylxanthate | | 130 | 130 | — | — | — | — |
| Vulcanizate Physical Property | Low-Heat-Generation Property (tanδ index) | 121 | 133 | 100 | 115 | 110 | 112 |

[Notes]
*2 to *18 are all the same as in Table 1 to Table 5, and *31 is the same as in Table 26.

TABLE 29

|  |  |  | Example |  |  |  |  |  | Comparative Example |  |  |  |  |  |
|---|---|---|---|---|---|---|---|---|---|---|---|---|---|---|
|  |  | part by mass | 172 | 173 | 174 | 175 | 176 | 177 | 45 | 46 | 47 | 48 | 49 | 50 |
| Formulation | First Stage of Kneading | Emulsion-Polymerized SBR-A *1 | 100 | 100 | 100 | 100 | 100 | 100 | 100 | 100 | 100 | 100 | 100 | 100 |
|  |  | Carbon Black N220 *2 | 10 | 10 | 10 | — | 10 | 10 | 10 | 10 | 10 | 10 | 10 | — |
|  |  | Silica *32 | 50 | 50 | 50 | 60 | 50 | 50 | 50 | 50 | 50 | 50 | 50 | 60 |
|  |  | Silane Coupling Agent Si75 *4 | 4.0 | 4.0 | 4.0 | 4.8 | 4.0 | 4.0 | 4.0 | — | 4.0 | 4.0 | 4.0 | 4.8 |
|  |  | Aromatic Oil | 30 | 30 | 30 | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | — | — | 2.0 | 2.0 |
|  |  | Antiaging Agent 6PPD *5 | 1.0 | 1.0 | 1.0 | 1.0 | 1.0 | 1.0 | 1.0 | 1.0 | — | — | 1.0 | 1.0 |
|  |  | 1-3-Phenylguanidine *6 according to kneading method A | 1.0 | 0.3 | 1.5 | 1.0 | 0.1 | 2.5 | — | — | — | — | — | — |
|  |  | 1-3-Phenylguanidine *6 according to kneading method B | — | — | — | — | — | — | — | — | — | 1.0 | 1.0 | — |
|  | Final Stage of Kneading | Stearic Acid | — | — | — | — | — | — | — | — | 2 | 2 | — | — |
|  |  | Antiaging Agent 6PPD *5 | — | — | — | — | — | — | — | — | 1.0 | 1.0 | — | — |
|  |  | Antiaging Agent TMDQ *7 | 1.0 | 1.0 | 1.0 | 1.0 | 1.0 | 1.0 | 1.0 | 1.0 | 1.0 | 1.0 | 1.0 | 1.0 |
|  |  | Zinc Flower | 2.5 | 2.5 | 2.5 | 2.5 | 2.5 | 2.5 | 2.5 | 2.5 | 2.5 | 2.5 | 2.5 | 2.5 |
|  |  | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
|  |  | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 |
|  |  | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
|  |  | Sulfur | 1.5 | 1.5 | 1.5 | 1.5 | 1.5 | 1.5 | 1.5 | 1.5 | 1.5 | 1.5 | 1.5 | 1.5 |
| Time (sec) until addition of 1,3-diphenylguanidine after addition of silica and silane coupling agent | | | 90 | 90 | 90 | 90 | 90 | 90 | — | — | — | 0 | 0 | — |
| Temperature (° C.) of rubber composition at addition of 1,3-diphenylguanidine | | | 130 | 130 | 130 | 130 | 130 | 130 | — | — | — | 70 | 70 | — |
| Vulcanizate Physical Property | Low-Heat-Generation Property (tanδ index) | | 142 | 137 | 140 | 146 | 126 | 137 | 100 | 101 | 105 | 107 | 112 | 104 |

[Notes]
*1 to *9 are all the same as in Table 1.
*32: Tosoh Silica's trade name "Nipseal KQ", BET specific surface area 240 m²/g

TABLE 30

|  |  |  | Example |  |  |  |  |  | Comparative Example |  |  |  |  |  |
|---|---|---|---|---|---|---|---|---|---|---|---|---|---|---|
|  |  | part by mass | 178 | 179 | 180 | 181 | 182 | 183 | 51 | 52 | 53 | 54 | 55 | 56 |
| Formulation | First Stage of Kneading | Emulsion-Polymerized SBR-A *1 | 100 | 100 | 100 | 100 | 100 | 100 | 100 | 100 | 100 | 100 | 100 | 100 |
|  |  | Carbon Black N220 *2 | 10 | 10 | 10 | — | 10 | 10 | 10 | 10 | 10 | 10 | 10 | — |
|  |  | Silica *33 | 50 | 50 | 50 | 60 | 50 | 50 | 50 | 50 | 50 | 50 | 50 | 60 |
|  |  | Silane Coupling Agent Si75 *4 | 4.0 | 4.0 | 4.0 | 4.8 | 4.0 | 4.0 | 4.0 | — | 4.0 | 4.0 | 4.0 | 4.8 |
|  |  | Aromatic Oil | 30 | 30 | 30 | 30 | 30 | 30 | 30 | 30 | 30 | 30 | 30 | 30 |
|  |  | Stearic Acid | 2.0 | 2.0 | 2.0 | 2.0 | 2.0 | 2.0 | 2.0 | 2.0 | — | — | 2.0 | 2.0 |
|  |  | Antiaging Agent 6PPD *5 | 1.0 | 1.0 | 1.0 | 1.0 | 1.0 | 1.0 | 1.0 | 1.0 | — | — | 1.0 | 1.0 |

TABLE 30-continued

| | part by mass | | Example | | | | | | Comparative Example | | | | | |
|---|---|---|---|---|---|---|---|---|---|---|---|---|---|---|
| | | | 178 | 179 | 180 | 181 | 182 | 183 | 51 | 52 | 53 | 54 | 55 | 56 |
| | | 1-3-Phenylguanidine *6 according to kneading method A | 1.0 | 0.3 | 1.5 | 1.0 | 0.1 | 2.5 | — | — | — | — | — | — |
| | | 1-3-Phenylguanidine *6 according to kneading method B | — | — | — | — | — | — | — | — | — | 1.0 | 1.0 | — |
| | Final Stage of Kneading | Stearic Acid | — | — | — | — | — | — | — | — | 2 | 2 | — | — |
| | | Antiaging Agent 6PPD *5 | — | — | — | — | — | — | — | — | 1.0 | 1.0 | — | — |
| | | Antiaging Agent TMDQ *7 | 1.0 | 1.0 | 1.0 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 |
| Time (sec) until addition of 1,3-diphenylguanidine after addition of silica and silane coupling agent | | | 90 | 90 | 90 | 90 | 90 | 90 | — | — | — | 0 | 0 | — |
| Temperature (° C.) of rubber composition at addition of 1,3-diphenylguanidine | | | 130 | 130 | 130 | 130 | 130 | 130 | — | — | — | 70 | 70 | — |
| Vulcanizate Physical Property | | Low-Heat-Generation Property (tanδ index) | 130 | 125 | 130 | 135 | 115 | 130 | 100 | 100 | 104 | 104 | 108 | 101 |

[Notes]
*1 to *9 are all the same as in Table 1.
*33: Tosoh Silica's trade name "Nipseal NS", BET specific surface area 160 m²/g

TABLE 31

| | part by mass | | Example | | | | | | Comparative Example | | | | | |
|---|---|---|---|---|---|---|---|---|---|---|---|---|---|---|
| | | | 184 | 185 | 186 | 187 | 188 | 189 | 57 | 58 | 59 | 60 | 61 | 62 |
| Formulation | First Stage of Kneading | Emulsion-Polymerized SBR-A *1 | 100 | 100 | 100 | 100 | 100 | 100 | 100 | 100 | 100 | 100 | 100 | 100 |
| | | Carbon Black N220 *2 | 10 | 10 | 10 | — | 10 | 10 | 10 | 10 | 10 | 10 | 10 | — |
| | | Silica *34 | 50 | 50 | 50 | 60 | 50 | 50 | 50 | 50 | 50 | 50 | 50 | 60 |
| | | Silane Coupling Agent Si75 *4 | 4.0 | 4.0 | 4.0 | 4.8 | 4.0 | 4.0 | 4.0 | — | 4.0 | 4.0 | 4.0 | 4.8 |
| | | Aromatic Oil | 30 | 30 | 30 | 30 | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 | — | — | 2.0 | 2.0 |
| | | Antiaging Agent 6PPD *5 | 1.0 | 1.0 | 1.0 | 1.0 | 1.0 | 1.0 | 1.0 | 1.0 | — | — | 1.0 | 1.0 |
| | | 1-3-Phenylguanidine *6 according to kneading method A | 1.0 | 0.3 | 1.5 | 1.0 | 0.1 | 2.5 | — | — | — | — | — | — |
| | | 1-3-Phenylguanidine *6 according to kneading method B | — | — | — | — | — | — | — | — | — | 1.0 | 1.0 | — |
| | Final Stage of Kneading | Stearic Acid | — | — | — | — | — | — | — | — | 2 | 2 | — | — |
| | | Antiaging Agent 6PPD *5 | — | — | — | — | — | — | — | — | 1.0 | 1.0 | — | — |
| | | Antiaging Agent TMDQ *7 | 1.0 | 1.0 | 1.0 | 1.0 | 1.0 | 1.0 | 1.0 | 1.0 | 1.0 | 1.0 | 1.0 | 1.0 |
| | | Zinc Flower | 2.5 | 2.5 | 2.5 | 2.5 | 2.5 | 2.5 | 2.5 | 2.5 | 2.5 | 2.5 | 2.5 | 2.5 |
| | | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
| | | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 |
| | | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 | 1.5 | 1.5 | 1.5 | 1.5 |
| Time (sec) until addition of 1,3-diphenylguanidine after addition of silica and silane coupling agent | | | 90 | 90 | 90 | 90 | 90 | 90 | — | — | — | 0 | 0 | — |
| Temperature (° C.) of rubber composition at addition of 1,3-diphenylguanidine | | | 130 | 130 | 130 | 130 | 130 | 130 | — | — | — | 70 | 70 | — |
| Vulcanizate Physical Property | | Low-Heat-Generation Property (tanδ index) | 120 | 115 | 118 | 125 | 111 | 124 | 100 | 100 | 103 | 102 | 106 | 101 |

[Notes]
*1 to *9 are all the same as in Table 1.
*34: Tosoh Silica's trade name "Nipseal NA", BET specific surface area 135 m²/g

TABLE 32

| | part by mass | | Example | | | | | | Comparative Example | | | | | |
|---|---|---|---|---|---|---|---|---|---|---|---|---|---|---|
| | | | 190 | 191 | 192 | 193 | 194 | 195 | 63 | 64 | 65 | 66 | 67 | 68 |
| Formulation | First Stage of Kneading | Emulsion-Polymerized SBR-A *1 | 100 | 100 | 100 | 100 | 100 | 100 | 100 | 100 | 100 | 100 | 100 | 100 |
| | | Carbon Black N220 *2 | 10 | 10 | 10 | — | 10 | 10 | 10 | 10 | 10 | 10 | 10 | — |
| | | Silica *35 | 50 | 50 | 50 | 60 | 50 | 50 | 50 | 50 | 50 | 50 | 50 | 60 |
| | | Silane Coupling Agent Si75 *4 | 4.0 | 4.0 | 4.0 | 4.8 | 4.0 | 4.0 | 4.0 | — | 4.0 | 4.0 | 4.0 | 4.8 |
| | | Aromatic Oil | 30 | 30 | 30 | 30 | 30 | 30 | 30 | 30 | 30 | 30 | 30 | 30 |
| | | Stearic Acid | 2.0 | 2.0 | 2.0 | 2.0 | 2.0 | 2.0 | 2.0 | 2.0 | — | — | 2.0 | 2.0 |

TABLE 32-continued

|  | part by mass | Example | | | | | | Comparative Example | | | | | |
|---|---|---|---|---|---|---|---|---|---|---|---|---|---|
|  |  | 190 | 191 | 192 | 193 | 194 | 195 | 63 | 64 | 65 | 66 | 67 | 68 |
|  | Antiaging Agent 6PPD *5 | 1.0 | 1.0 | 1.0 | 1.0 | 1.0 | 1.0 | 1.0 | 1.0 | — | — | 1.0 | 1.0 |
|  | 1-3-Phenylguanidine *6 according to kneading method A | 1.0 | 0.3 | 1.5 | 1.0 | 0.1 | 2.5 | — | — | — | — | — | — |
|  | 1-3-Phenylguanidine *6 according to kneading method B | — | — | — | — | — | — | — | — | — | 1.0 | 1.0 | — |
| Final Stage of Kneading | Stearic Acid | — | — | — | — | — | — | — | — | 2 | 2 | — | — |
|  | Antiaging Agent 6PPD *5 | — | — | — | — | — | — | — | — | 1.0 | 1.0 | — | — |
|  | Antiaging Agent TMDQ *7 | 1.0 | 1.0 | 1.0 | 1.0 | 1.0 | 1.0 | 1.0 | 1.0 | 1.0 | 1.0 | 1.0 | 1.0 |
|  | Zinc Flower | 2.5 | 2.5 | 2.5 | 2.5 | 2.5 | 2.5 | 2.5 | 2.5 | 2.5 | 2.5 | 2.5 | 2.5 |
|  | 1,3-Diphenylguanidine *6 | 0.6 | 0.6 | 0.6 | 0.6 | 0.6 | 0.6 | 0.6 | 0.6 | 0.6 | 0.6 | 0.6 | 0.6 |
|  | Vulcanization Promoter MBTS *8 | 1.0 | 1.0 | 1.0 | 1.0 | 1.0 | 1.0 | 1.0 | 1.0 | 1.0 | 1.0 | 1.0 | 1.0 |
|  | Vulcanization Promoter TBBS *9 | 0.6 | 0.6 | 0.6 | 0.6 | 0.6 | 0.6 | 0.6 | 0.6 | 0.6 | 0.6 | 0.6 | 0.6 |
|  | Sulfur | 1.5 | 1.5 | 1.5 | 1.5 | 1.5 | 1.5 | 1.5 | 1.5 | 1.5 | 1.5 | 1.5 | 1.5 |
| Time (sec) until addition of 1,3-diphenylguanidine after addition of silica and silane coupling agent | | 90 | 90 | 90 | 90 | 90 | 90 | — | — | — | 0 | 0 | — |
| Temperature (° C.) of rubber composition at addition of 1,3-diphenylguanidine | | 130 | 130 | 130 | 130 | 130 | 130 | — | — | — | 70 | 70 | — |
| Vulcanizate Physical Property | Low-Heat-Generation Property (tan δ index) | 113 | 106 | 111 | 114 | 106 | 111 | 100 | 100 | 101 | 100 | 103 | 100 |

[Notes]
*1 to *9 are all the same as in Table 1.
*35: Tosoh Silica's trade name "Nipseal ER", BET specific surface area 95 m²/g As obvious from Table 1 to Table 32, the rubber compositions of Examples 1 to 195 are all better than the comparative rubber compositions of Comparative Examples 1 to 68 in point of the low-heat-generation property (tan δ index).

INDUSTRIAL APPLICABILITY

According to the production method for a rubber composition of the present invention, it is possible to obtain a rubber composition excellent in low-heat-generation property with successfully inhibiting the coupling function activity of the silane coupling agent used from lowering and with further increasing the coupling function activity thereof, and is therefore favorably used as a production method for constitutive members of various types of pneumatic tires for passenger cars, small-size trucks, minivans, pickup trucks and big-size vehicles (trucks, buses, construction vehicles, etc.) and others, especially for tread members of pneumatic radial tires.

The invention claimed is:

1. A method for producing a rubber composition containing a rubber component (A) of at least one selected from natural rubbers and synthetic dienic rubbers, a filler containing an inorganic filler (B), a silane coupling agent (C) and a vulcanization promoter (D), wherein the rubber composition is kneaded in multiple stages, and in the first stage of kneading, the rubber component (A), all or a part of the inorganic filler (B), and all or a part of the silane coupling agent (C) are kneaded, and then the vulcanization promoter (D) is added and further kneaded;
   wherein the number of molecules of the vulcanization promoter (D) in the rubber composition in the first stage of kneading is from 0.1 to 1.0 time the number of molecules of the silane coupling agent (C) therein.

2. The method for producing a rubber composition according to claim 1, wherein the vulcanization promoter (D) is at least one selected from guanidines, sulfenamides, thiazoles, thiurams, dithiocarbamate salts, thioureas and xanthate salts.

3. The method for producing a rubber composition according to claim 1, wherein in the first stage, the vulcanization promoter (D) is added when the temperature of the rubber composition has reached from 130 to 180° C.

4. The method for producing a rubber composition according to claim 1, wherein in the first stage, the time to be taken before the vulcanization promoter (D) is added after the rubber component (A), all or a part of the inorganic filler (B) and all or a part of the silane coupling agent (C) are added is from 10 to 180 seconds.

5. The method for producing a rubber composition according to claim 1, wherein the silane coupling agent (C) is at least one compound selected from a group of compounds represented by the following general formulae (I) to (IV):

[Chemical Formula 1]

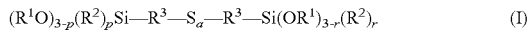

$(R^1O)_{3-p}(R^2)_pSi-R^3-S_a-R^3-Si(OR^1)_{3-r}(R^2)_r$     (I)

(wherein multiple $R^1$'s may be the same or different, each representing a linear, cyclic or branched alkyl group having from 1 to 8 carbon atoms, a linear or branched alkoxylalkyl group having from 2 to 8 carbon atoms, or a hydrogen atom; multiple $R^2$'s may be the same or different, each representing a linear, cyclic or branched alkyl group having from 1 to 8 carbon atoms; multiple $R^3$'s may be the same or different, each representing a linear or branched alkylene group having from 1 to 8 carbon atoms; a indicates from 2 to 6 as a mean value; p and r may be the same or different, each indicating from 0 to 3 as a mean value, provided that both p and r are not 3 at the same time);

[Chemical Formula 2]

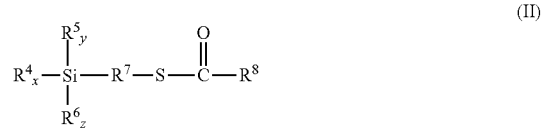

(II)

(wherein $R^4$ represents a monovalent group selected from —Cl, —Br, $R^9O$—, $R^9C(=O)O$—, $R^9R^{10}C=NO$—, $R^9R^{10}CNO$—, $R^9R^{10}N$—, and —$(OSiR^9R^{10})_h$ $(OSiR^9R^{10}R^{11})$ (where $R^9$, $R^{10}$ and $R^{11}$ each represents a hydrogen atom or a monovalent hydrocarbon group having from 1 to 18 carbon atoms; and h indicates from 1 to 4 as a mean value); $R^5$ represents $R^4$, a hydrogen atom, or a hydrocarbon group having from 1 to 18 carbon atoms; $R^6$ represents $R^4$, $R^5$, a hydrogen atom, or a group $-[O(R^{12}O)_j]_{0.5}$ (where $R^{12}$ represents an alkylene group having from 1 to 18 carbon atoms; and j indicates an integer of from 1 to 4); $R^7$ represents a divalent hydrocarbon group having from 1 to 18 carbon atoms; $R^8$ represents a monovalent hydrocarbon group having from 1 to 18 carbon atoms; x, y and z each indicates a number satisfying the relationship of x+y+2z=3, 0≤x≤3, 0≤y≤2, 0≤z≤1);

[Chemical Formula 3]

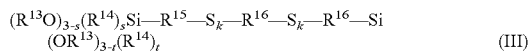

(III)

(wherein multiple $R^{13}$'s may be the same or different, each representing a linear, cyclic or branched alkyl group having from 1 to 8 carbon atoms, a linear or branched alkoxylalkyl group having from 2 to 8 carbon atoms, or a hydrogen atom; multiple $R^{14}$'s may be the same or different, each representing a linear, cyclic or branched alkyl group having from 1 to 8 carbon atoms; multiple $R^{15}$'s may be the same or different, each representing a linear or branched alkylene group having from 1 to 8 carbon atoms; $R^{16}$ represents a divalent group of a general formula ($-S-R^{17}-S-$), ($-R^{18}-S_{m1}-R^{19}-$) or ($-R^{20}-S_{m2}-R^{21}-S_{m3}-R^{22}-$) (where $R^{17}$ to $R^{22}$ each represents a divalent hydrocarbon group, a divalent aromatic group or a divalent organic group containing a hetero element except sulfur and oxygen, having from 1 to 20 carbon atoms; m1, m2 and m3 may be the same or different, each indicating from 1 to less than 4 as a mean value); multiple k's may be the same or different, each indicating from 1 to 6 as a mean value; s and t each indicates from 0 to 3 as a mean value, provided that both s and t are not 3 at the same time);

[Chemical Formula 4]

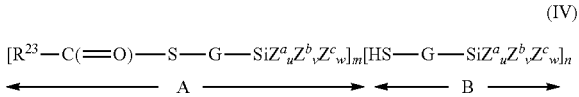

(IV)

(wherein $R^{23}$ represents a linear, branched or cyclic alkyl group having from 1 to 20 carbon atoms; multiple G's may be the same or different, each representing an alkanediyl group or an alkenediyl group having from 1 to 9 carbon atoms; multiple $Z^a$'s may be the same or different, each representing a functional group capable of bonding to the two silicon atoms and selected from $[-O-]_{0.5}$, $[-O-G-]_{0.5}$ and $[-O-G-O-]_{0.5}$; multiple $Z^b$'s may be the same or different, each representing a functional group capable of bonding to the two silicon atoms and represented by $[-O-G-O-]_{0.5}$; multiple $Z^c$'s may be the same or different, each representing a functional group selected from $-Cl$, $-Br$, $-OR^a$, $R^aC(=O)O-$, $R^aR^bC=NO-$, $R^aR^bN-$, $R^a-$ and $HO-G-O-$ (where G is the same as above); $R^a$ and $R^b$ each represents a linear, branched or cyclic alkyl group having from 1 to 20 carbon atoms; m, n, u, v and w each are 1≤m≤20, 0≤n≤20, 0≤u≤3, 0≤v≤2, 0≤w≤1, and (u/2)+v+2w is 2 or 3; in case where the formula has multiple A's, then $Z^a_u$, $Z^b_v$ and $Z^c_w$ may be the same or different in those multiple A's; in case where the formula has multiple B's, then $Z^a_u$, $Z^b_v$ and $Z^c_w$ may be the same or different in those multiple B's).

6. The method for producing a rubber composition according to claim 5, wherein the silane coupling agent (C) is a compound represented by the general formula (I).

7. The method for producing a rubber composition according to claim 1, wherein the inorganic filler (B) is silica.

8. The method for producing a rubber composition according to claim 1, wherein the inorganic filler (B) accounts for at least 30% by mass of the filler.

9. The method for producing a rubber composition according to claim 1, wherein the vulcanization promoter (D) comprises a guanidine, and the guanidine is at least one compound selected from 1,3-diphenylguanidine, 1,3-di-o-tolylguanidine and 1-o-tolylbiguanide.

10. The method for producing a rubber composition according to claim 1, wherein the vulcanization promoter (D) comprises a sulfenamide, and the sulfenamide is at least one compound selected from N-cyclohexyl-2-benzothiazolylsulfenamide and N-tert-butyl-2-benzothiazolylsulfenamide.

11. The method for producing a rubber composition according to claim 1, wherein the vulcanization promoter (D) comprises a thiazole, and the thiazole is at least one compound selected from 2-mercaptobenzothiazole and di-2-benzothiazolyl disulfide.

12. The method for producing a rubber composition according to claim 1, wherein the vulcanization promoter (D) comprises a thiuram, and the thiuram is at least one compound selected from tetrakis(2-ethylhexyl)thiuram disulfide and tetrabenzylthiuram disulfide.

13. The method for producing a rubber composition according to claim 1, wherein the vulcanization promoter (D) comprises a thiourea, and the thiourea is at least one compound selected from N,N'-diethylthiourea, trimethylthiourea, N,N'-diphenylthiourea and N,N'-dimethylthiourea.

14. The method for producing a rubber composition according to claim 1, wherein the vulcanization promoter (D) comprises a dithiocarbamate salt, and the dithiocarbamate salt is at least one compound selected from zinc dibenzyldithiocarbamate, zinc N-ethyl-N-phenyldithiocarbamate, zinc dimethyldithiocarbamate and copper dimethyldithiocarbamate.

15. The method for producing a rubber composition according to claim 1, wherein the vulcanization promoter (D) comprises a xanthate salt, and the xanthate salt is zinc isopropylxanthate.

16. The method for producing a rubber composition according to claim 1, wherein at least 50 mol % of an organic acid compound in the rubber composition in the first stage of kneading is stearic acid.

17. The method for producing a rubber composition according to claim 1, wherein the rubber component (A) contains at least one selected from emulsion-polymerized styrene-butadiene copolymer and natural rubber, and at least 50 mol % of an organic acid compound contained in the rubber composition in the first stage of kneading is at least one compound selected from rosin acids and fatty acids contained in at least one selected from the emulsion-polymerized styrene butadiene copolymer and the natural rubber.

* * * * *